(12) United States Patent
Yamada et al.

(10) Patent No.: US 7,871,452 B2
(45) Date of Patent: Jan. 18, 2011

(54) PARTICULATE FILTER

(75) Inventors: Hiroshi Yamada, Hiroshima (JP); Kenji Suzuki, Hiroshima (JP); Koichiro Harada, Hiroshima (JP); Kenji Okamoto, Hiroshima (JP); Akihide Takami, Hiroshima (JP); Susumu Mineoi, Hiroshima (JP); Hirosuke Sumida, Hiroshima (JP)

(73) Assignee: Mazda Motor Corporation (JP)

( * ) Notice: Subject to any disclaimer, the term of this patent is extended or adjusted under 35 U.S.C. 154(b) by 282 days.

(21) Appl. No.: 12/243,171

(22) Filed: Oct. 1, 2008

(65) Prior Publication Data
US 2009/0084266 A1 Apr. 2, 2009

(30) Foreign Application Priority Data
Oct. 1, 2007 (JP) ............................. 2007-257663
Aug. 1, 2008 (JP) ............................. 2008-199434

(51) Int. Cl.
*B01D 53/94* (2006.01)
*B01J 23/68* (2006.01)

(52) U.S. Cl. .......................... 55/523; 55/524; 502/302; 502/349; 422/177

(58) Field of Classification Search ............... 55/523, 55/524, DIG. 30; 428/116; 502/302, 349, 502/351, 355; 422/177
See application file for complete search history.

(56) References Cited

U.S. PATENT DOCUMENTS 6,151,547 A 11/2000 Kumar et al.

6,423,293 B1 * 7/2002 Chun et al. .................. 423/579

(Continued)

FOREIGN PATENT DOCUMENTS

EP 1920835 A2 5/2008

(Continued)

OTHER PUBLICATIONS

Database WPI Week 200731; Thomson Scientific; London, GB; AN 2007-318202; XP02503171; Apr. 5, 2007.

(Continued)

*Primary Examiner*—Frank M Lawrence
(74) *Attorney, Agent, or Firm*—Studebaker & Brackett PC; Donald R. Studebaker

(57) ABSTRACT

Disclosed is a particulate filter, which is adapted to be disposed in an exhaust passage of an engine to trap particulate matter contained in exhaust gas discharged from the engine. The particulate filter comprises a filter body having a porous partition wall which defines a plurality of exhaust gas channels allowing the exhaust gas to pass therethrough, and a catalyst layer formed on a surface of the porous partition wall. The catalyst layer includes a Zr-based composite oxide which contains zirconium (Zr), and a rare-earth metal except cerium, wherein a content ratio of an oxide of the non-cerium rare-earth metal to a total amount of $ZrO_2$ and the oxide of the non-cerium rare-earth metal in the Zr-based composite oxide is set in the range of greater than 33 mol % to less than 40 mol %. The particulate filter of the present invention can achieve a higher PM burning rate to burn PM within a shorter period of time. In addition, the higher PM burning rate makes it possible to provide enhanced fuel economy performance in an engine designed to perform a post-injection control.

8 Claims, 12 Drawing Sheets

U.S. PATENT DOCUMENTS

| | | | |
|---|---|---|---|
| 6,461,579 B1 * | 10/2002 | Hachisuka et al. | 423/213.5 |
| 7,094,728 B2 * | 8/2006 | Yan et al. | 502/300 |
| 7,722,829 B2 * | 5/2010 | Punke et al. | 422/180 |
| 2004/0065078 A1 | 4/2004 | Schafer-Sindlinger et al. | |
| 2005/0119117 A1 | 6/2005 | Yoshida et al. | |
| 2006/0245985 A1 | 11/2006 | Harada et al. | |
| 2007/0041881 A1 * | 2/2007 | Voss et al. | 422/177 |
| 2007/0104623 A1 * | 5/2007 | Dettling et al. | 422/177 |
| 2007/0191219 A1 | 8/2007 | Fujita et al. | |
| 2008/0020922 A1 * | 1/2008 | Li et al. | 502/73 |
| 2008/0096759 A1 | 4/2008 | Hori et al. | |

FOREIGN PATENT DOCUMENTS

| | | |
|---|---|---|
| JP | 2007054713 | 3/2007 |
| JP | 2007083224 | 4/2007 |
| JP | 2008221204 A | 9/2008 |

OTHER PUBLICATIONS

Database WPI Week 200724; Thomson Scientific; London, GB; AN 2007-235756; XP002503172; Mar. 8, 2007.

Herbert Luethe; European Search Report; EP 08165611; Dec. 19, 2008.

* cited by examiner

- ⊘ OXYGEN ION
- ○ OXYGEN ION VACANCY
- ● SUBSTITUTIVE METAL ION
- ○ $ZrO_2$ ION

PARTICULATE FILTER

BACKGROUND OF THE INVENTION

1. Field of the Invention

The present invention relates to a particulate filter for suppressing the emission of particulate matter contained in exhaust gas of an engine capable of a lean-burn operation, such as a diesel engine or a lean-burn gasoline engine.

2. Background Art

Exhaust gas from an engine capable of a lean-burn operation, such as a diesel engine or a lean-burn gasoline engine, contains therein particulate matter (PM) consisting primarily of carbonaceous components. With a view to reducing adverse environmental effects causes by the emission of such PM, a particulate filter is disposed in an exhaust passage of the engine to trap PM. The trapped PM will be gradually accumulated on the particulate filter in proportion to an operating time (engine operation time). Thus, the engine is designed to perform a control of burning the accumulated PM before an amount of accumulated PM reaches a predetermined value or more, to regenerate the particulate filter.

For example, as a technique of burning PM, there has been known one type of burning PM using a burner or a heater. In recent years, there has also been employed another type of burning hydrocarbon (HC) components contained in fuel and exhaust gas, by an oxidation catalyst disposed upstream of a particulate filter, to increase an exhaust gas temperature so as to promote burning of PM.

Generally, PM is self-ignited under an oxidation atmosphere at a temperature of slightly less than 700° C. It is known that this self-ignition temperature can be lowered by an action of a catalytic noble metal, such as platinum (Pt). Thus, some particulate filters are designed such that a catalyst layer containing, for example, Pt-supporting alumina particles, is wash-coated onto a surface of an exhaust gas channel allowing exhaust gas to pass therethrough, to allow PM to be burnt at a relatively low temperature. Further, with a view to effectively promoting ignition/burning of PM, it has been proposed a technique of incorporating, into a catalyst layer, an oxygen-absorbing/releasing material containing an oxide of cerium (Ce) and having an active-oxygen releasing capability, to utilize oxygen released from the oxygen-absorbing/releasing material, and a technique of incorporating, into a catalyst layer, an oxygen-ion conducting material containing an oxide of zirconium (Zr) and having an oxygen-ion conductivity, to utilize oxygen conducted through the oxygen-ion conducting material.

As an example of the above wash-coated particulate filter, JP 2006-326573A discloses a diesel particulate filter comprising a catalyst layer including a Ce—Zr based composite oxide which contains Ce, Zr, and a rare-earth element R except Ce, wherein a molar ratio of R/(Ce+Zr+R) is in the range of 2 to 11%.

JP 2007-054713A discloses a diesel particulate filter comprising a particulate matter oxidation catalyst including at least one of: a Zr-based composite oxide which contains Zr as a primary component, and a rare-earth metal except Ce and yttrium (Y); and a Ce-based composite oxide which contains Ce as a primary component, and a rare-earth metal except Ce or an oxide of an alkaline-earth metal.

JP 2007-083224A discloses a diesel particulate filter comprising a particulate matter oxidation catalyst including: a Zr-based composite oxide which contains Zr as a primary component, and a rare-earth metal except Ce; and alumina, wherein each of the Zr-based composite oxide and the alumina supports a catalytic noble metal thereon.

In an operation of burning PM, i.e., an operation of regenerating a particulate filter, it is necessary to allow exhaust gas to have a relatively high temperature. Thus, for example, following a main-injection for injecting fuel around a compression top dead center (i.e., top dead center of a compression stroke), a post-injection is performed at a non-ignition timing later than the compression top dead center, to add fuel to exhaust gas, and then the added fuel is burnt by an action of an oxidation catalyst so as to increase an exhaust gas temperature based on heat from the burning, to promote burning of PM. If a burning rate (i.e., burning velocity or speed) of PM (hereinafter referred to as "PM burning rate") is low, it needs to take a long time for completely burning PM, which leads to an increase in fuel consumption for burning the PM, causing deterioration in fuel economy performance. In view of reducing the fuel consumption for burning PM, it is requited to further increase the PM burning rate as compared with those based on the catalysts disclosed in the JP 2006-326573A, the JP 2007-054713A and the JP 2007-083224A.

The JP 2006-326573A, the JP 2007-054713A and the JP 2007-083224A include a description that a higher PM burning rate can be obtained in an initial stage by increasing a content ratio of the rare-earth metal except Ce. However, it was considered that, if the content ratio of the rare-earth metal except Ce is increased, heat resistance deteriorates, and thereby the catalyst will be thermally damaged to cause a reduction in catalytic efficiency.

For reference, as an example of an exhaust gas purifying catalyst comprising a catalyst layer which includes a composite oxide containing Zr, the pamphlet of WO 06/046316A discloses an exhaust gas purifying catalyst comprising a catalyst support substrate, and a plurality of catalyst layers provided on a surface of the catalyst support substrate, wherein an uppermost one of the catalyst layers which defines a top surface thereof, includes a stabilized zirconia containing Zr, and a Ce—Zr composite oxide.

The catalyst disclosed in the pamphlet of WO 06/046316A is intended to enhance catalyst durability by means of incorporating the stabilized zirconia and the Ce—Zr composite oxide into the uppermost layer. Thus, this catalyst is incapable of promoting the burning of PM, and therefore cannot be directly applied to a particulate filter.

SUMMARY OF THE INVENTION

In view of the above circumstances, it is an object of the present invention to provide a particulate filter capable of burning PM within a relatively short period of time.

According to one aspect of the present invention, there is provided a particulate filter adapted to be disposed in an exhaust passage of an engine to trap particulate matter contained in exhaust gas discharged from the engine. The particulate filter comprises a filter body having a porous partition wall which defines a plurality of exhaust gas channels allowing the exhaust gas to pass therethrough, and a catalyst layer formed on a surface of the porous partition wall. The catalyst layer includes a Zr-based composite oxide which contains zirconium (Zr), and a rare-earth metal except cerium, wherein a content ratio of an oxide of the non-cerium rare-earth metal to a total amount of $ZrO_2$ and the oxide of the non-cerium rare-earth metal in the Zr-based composite oxide is set in the range of greater than 33 mol % to less than 40 mol %.

It was considered that, although a content ratio of an oxide of a rare-earth metal except cerium (the rare-earth metal except cerium will hereinafter be referred to as "non-cerium rare-earth metal") in a Zr-based composite oxide included in a catalyst layer may be increased to obtain a higher PM burning rate, a crystal structure of the Zr-based composite oxide is liable to be changed, and consequently heat resistance deteriorates to cause a reduction in catalytic efficiency. However, the inventors have found that, when the content ratio of the oxide of the non-cerium rare-earth metal is set in the above specific range, a crystal structure of the Zr-based composite oxide is slightly changed just after being exposed to high-temperature exhaust gas, but the slightly-changed crystal structure will be subsequently maintained almost without any change. The inventors have also found that the Zr-based composite oxide having the slightly-changed crystal structure provides a higher PM burning rate.

Thus, the particulate filter of the present invention can achieve a higher PM burning rate to burn PM within a shorter period of time. In addition, the higher PM burning rate makes it possible to provide enhanced fuel economy performance in an engine designed to perform a post-injection control.

DESCRIPTION OF THE PREFERRED EMBODIMENTS

A diesel particulate filter (DPF) according to an embodiment of the present invention will be described.

Figure 1:
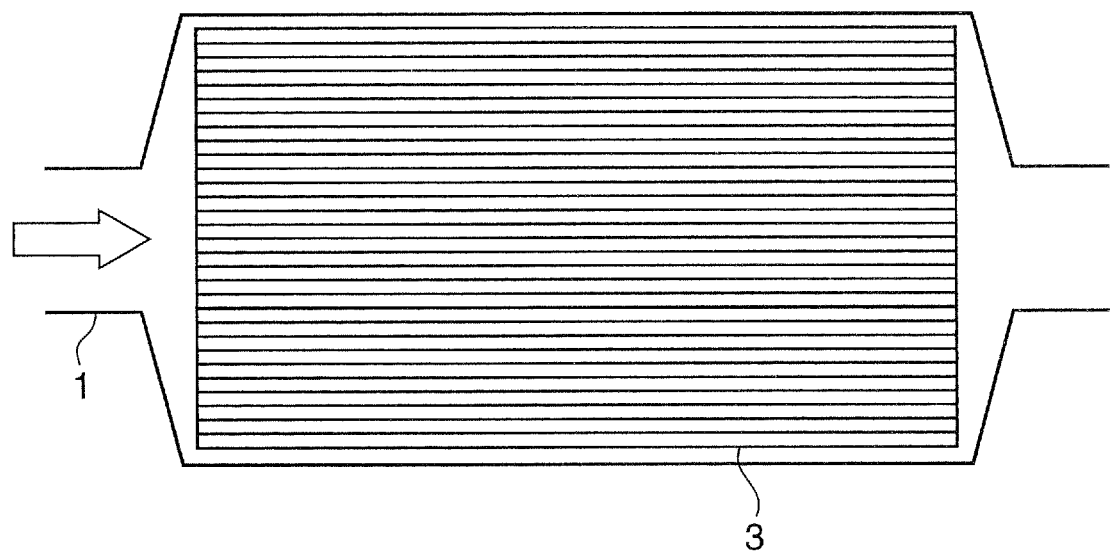
FIG. 1 is a schematic diagram showing a diesel particulate filter (DPF) 3 in a state after being incorporated in an exhaust passage 1 of a diesel engine.

FIG. 1 is a schematic diagram showing the DPF 3 in a state after being disposed in an exhaust passage 1 of a diesel engine. An exhaust pipe constituting the exhaust passage (i.e., exhaust gas passage) 1 is connected to an diesel engine body (not shown) through an exhaust manifold (not shown). As shown in FIG. 1, exhaust gas discharged from the diesel engine body streams through the exhaust passage 1 in a direction indicated by the outline arrow (in FIG. 1, a rightward direction). The DPF 3 is interposed in the exhaust passage 1 to trap PM contained in the exhaust gas.

Figure 2:
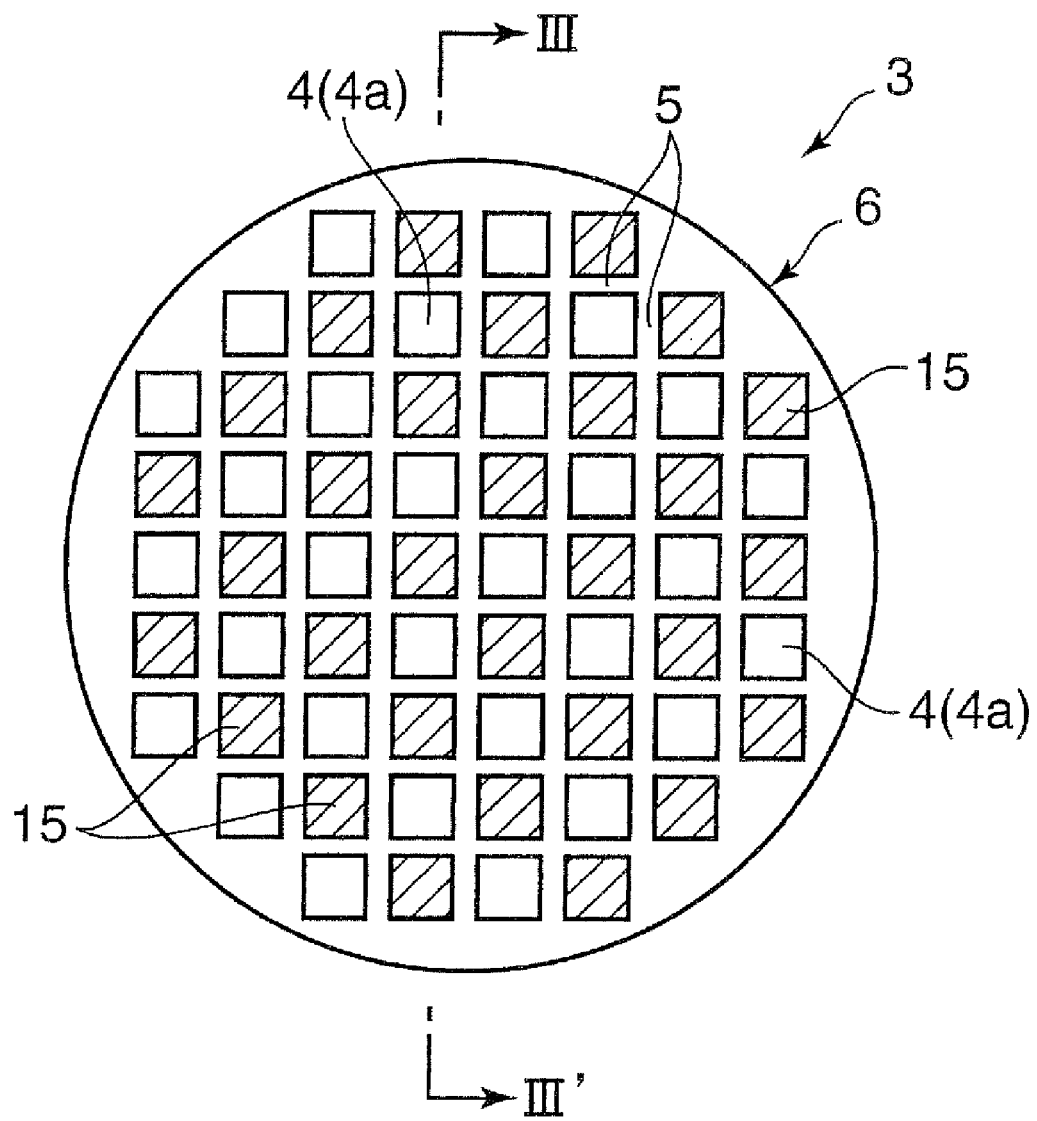
FIG. 2 is a schematic diagram showing the DPF 3, when viewed from an upstream side in a direction of an exhaust gas stream.
Figure 3:
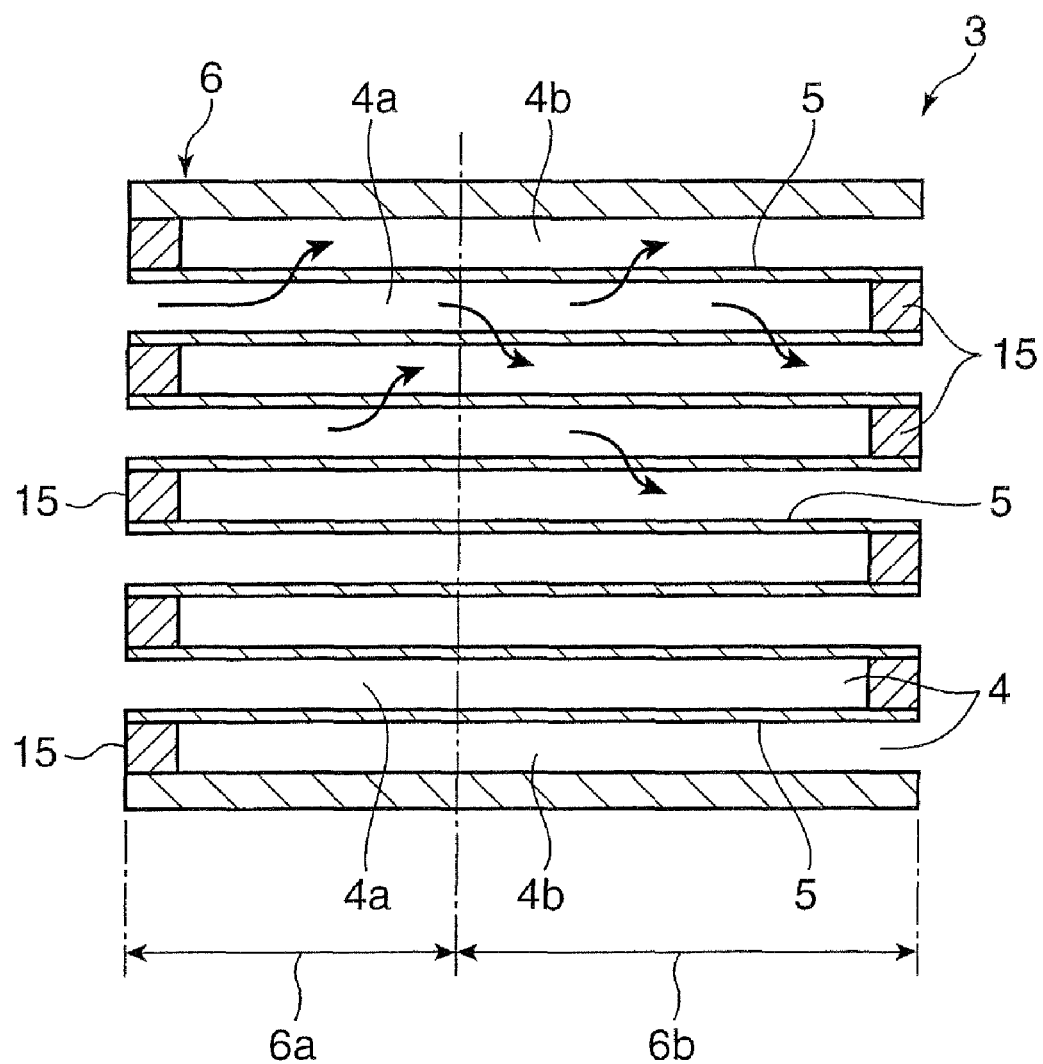
FIG. 3 is a schematic sectional view of the DPF 3 in FIG. 2, taken along the line III-III'.
Figure 4:
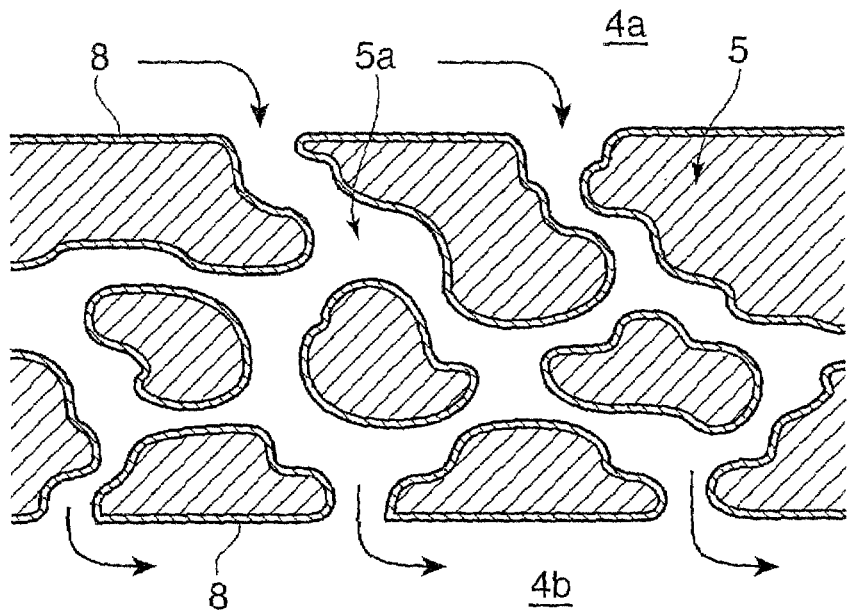
FIG. 4 is an enlarged sectional view of a porous partition wall 5.

FIG. 2 is a schematic diagram showing the DPF 3, when viewed from an upstream side in the direction of the exhaust gas stream. FIG. 3 is a schematic sectional view of the DPF 3 in FIG. 2, taken along the line III-III'. The DPF 3 is a so-called wall-flow type formed to have a cylindrical outer shape. Specifically, the DPF 3 comprises a filter body 6 formed in a honeycomb configuration in which a large number of exhaust gas channels (cells) 4 are defined by a porous partition wall 5 made of a thermally-resistant ceramics, such as cordierite, SiC or $Si_3N_4$, in such a manner as to extend in parallel relation to each other along the direction of the exhaust gas stream, and a plugging portion 15 which gas-tightly plugs respective exhaust gas inlets (upstream ends) of a part (i.e., exhaust-gas outlet channels) 4b of the channels 4, and respective exhaust gas outlets (downstream ends) of the remaining channels (i.e., exhaust-gas inlet channels) 4a, in a zigzag pattern. FIG. 4 is an enlarged sectional view of the porous partition wall 5. The porous partition wall 5 has microscopic pores 5a providing fluid communication between the exhaust inlet channels 4a and the exhaust-gas outlet channels 4b.

Thus, in the DPF 3, exhaust gas introduced from the exhaust-gas inlet channels 4a each having the open upstream end and the plugged downstream end is led into the exhaust-gas outlet channels 4b each having the plugged upstream end and the open downstream end, through the porous partition wall 5 surrounding them, and discharged from the respective open downstream ends of the exhaust-gas outlet channels 4b. That is, the exhaust gas is led from the exhaust-gas inlet channels 4a into the exhaust-gas outlet channels 4b while passing through the pores 5a of the porous partition wall 5. During this process, PM contained in the exhaust gas is trapped mainly by and accumulated on an inner wall surface of the exhaust-gas inlet channels 4a and a surface of the pores 5a of the porous partition wall 5.

As shown in FIG. 4, the DPF 3 further comprises a catalyst layer 8 which is prepared to include a particulate matter oxidation catalyst capable of promoting burning of PT, and formed on a surface of the porous partition wall 5. The catalyst layer 8 including the particulate matter oxidation catalyst may be formed only on the inner wall surface of the exhaust-gas inlet channels 4a and the surface of the pores 5a of the porous partition wall 5, or may be formed, for example, on the entire region of the channels 4.

While the particulate matter oxidation catalyst may consists of a composite oxide in its simple form, it preferably consists of a composite oxide which supports a catalytic noble metal thereon to lower an initiation temperature of burning of PT.

The catalytic noble metal serves as a means not only to lower an initiation temperature of burning of PT but also to oxidize hydrocarbon (HC) and carbon monoxide (CO). For example, the catalytic noble metal may be at least one selected from the group consisting of platinum (Pt), palladium (Pd) and rhodium (Rd). Among then, Pt is particularly preferable. For example, as a technique of supporting Pt onto the composite oxide may comprise adding a nitric acid solution of dinitrodiamine platinum to the composite oxide to form a mixture thereof, and subjecting the mixture to evaporation to dryness. For example, with regard to Pt, an amount of the catalytic noble metal to be supported onto the composite oxide may be controlled by adjusting a concentration and/or amount of the nitric acid solution of dinitrodiamine platinum.

While the catalyst layer includes, as the composite oxide, a Zr-based composite oxide containing zirconium (Zr) as a primary component, it may further include: a Zr—Ce based composite oxide containing Zr and cerium (Ce); and alumina ($Al_2O_3$). In use of the Zr—Ce based composite oxide and the alumina, a catalytic noble metal is preferably supported thereon.

The Zr-based composite oxide has an oxygen-ion conductivity as will be described later in detail. For this purpose, the Zr-based composite oxide is prepared such that it contains Zr as a primary component, and a rare-earth metal R except Ce (i.e., a non-Ce rare-earth metal R). For example, the non-Ce rare-earth metal R to be contained in the Zr-based composite oxide may include scandium (Sc), yttrium (Y), lanthanum (La), praseodymium (Pr), neodymium (Nd), promethium (Pm), samarium (Sm), europium (Eu), gadolinium (Gd), terbium (Th), dysprosium (Dy), holmium (Ho), erbium (Er), thulium (Tm), ytterbium (Yb) and lutetium (Lu). Among them, the non-Ce rare-earth metal R is preferably at least one selected from the group consisting of Nd, La and Pr. In view of heat resistance, it is particularly preferable to incorporate Nd into the Zr-based composite oxide.

Preferably, the Zr-based composite oxide is included in the catalyst layer in an amount ranging from 1 to 80 g/L, more preferably in an amount ranging from 5 to 40 g/L. The preferable content range may be appropriately determined depending on an average pore size and a porosity of the partition wall or a cell density of the filter body. For example, considering with a focus on the average pore size of the partition wall, if the average pore size is in the range of about 10 to 30 μm, the Zr-based composite oxide may be included in the range of 1 to 30 g/L. If the average pore size is greater than about 30 μm, the Zr-based composite oxide may be included in a larger amount within the above preferable content range. Then, the content of the Zr-based composite oxide may be finely adjusted depending on the porosity and the cell density. If the content of the Zr-based composite oxide is excessively reduced, a PM burning capability is liable to become unable to be sufficiently brought out. If the content of the Zr-based composite oxide is excessively increased, a back pressure of the DPF 3 is liable to be excessively increased.

The Zr—Ce based composite oxide has an oxygen-absorbing/releasing capability, wherein oxygen released from the Zr—Ce based composite oxide is utilized for promoting oxidation of HC and CO and enhancing light-off performance.

The alumina serves as a means to enhance dispersibility of the catalytic noble metal to enhance light-off performance for HC and CO. In view of heat resistance, the alumina is preferably a type stabilized by a rare-earth metal R, such as La.

Further, in view of preventing sintering of the catalytic noble metal, the alumina preferably has a specific surface area of 250 $m^2$/g or more.

The catalyst layer 8 may be formed by supporting the catalytic noble metal onto the composite oxide, mixing the catalytic noble metal-supporting composite oxide with water and binder to form a slurry, coating the channel-defining inner wall surface of the filter body 6 with the slurry, blowing air against the filter body 6 to remove an excess part of the slurry, and then subjecting the filter body 6 to drying and calcination. Dimensions of the catalyst layer 8, such as a layer thickness, can be adjusted based, for example, on a viscosity and/or density of the slurry. When the particulate matter oxidation catalyst of the catalyst layer 8 includes two types or more of composite oxides, the catalytic noble metal is preferably supported on each of the composite oxides.

Figure 5A:
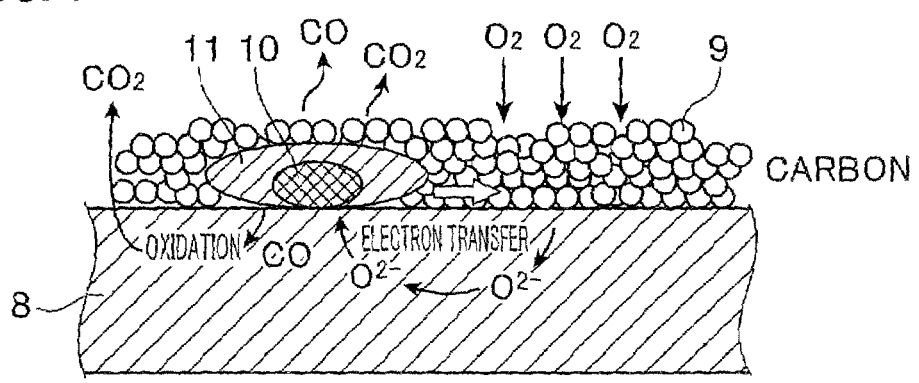
FIG. 5A is an enlarged sectional view showing a catalyst layer 8 having carbon particles 9 accumulated thereon.
Figure 5B:
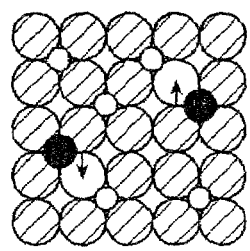
FIG. 5B is a schematic diagram showing a crystal lattice of a Zr-based composite oxide included in the catalyst layer 8.

The Zr-based composite oxide included in the particulate matter oxidation catalyst has an oxygen-ion conductivity. A mechanism of allowing PM to be oxidized by the particulate matter oxidation catalyst using the composite oxide having the oxygen-ion conductivity is assumed as follows. FIGS. 5A and 5B are explanatory diagrams showing the PM oxidation mechanism, wherein FIG. 5A is an enlarged sectional view showing the catalyst layer 8 having carbon particles 9 accumulated thereon, and FIG. 5B is a schematic diagram showing a crystal lattice of the Zr-based composite oxide included in the catalyst layer 8.

When exhaust gas is discharged from the diesel engine body, and PM contained in the exhaust gas is trapped by the DPF 3, carbon particles 9 (hereinafter referred to collectively as "carbon 9") as the PM are accumulated on the catalyst layer 8. The carbon 9 has a porous structure and a property capable of easily binding with oxygen. Thus, under an oxygen-excess condition, release/extrication of oxygen occurs in a surface of the catalyst layer 8 on which the carbon 9 is accumulated, and an oxygen concentration in the surface is lowered to cause a microscopic difference in oxygen concentration relative to the remaining region (i.e., inside region) of the catalyst layer 8.

If a certain site of the surface of the catalyst layer 8 is lowered, as described above, an oxygen ion $O^{2-}$ is transferred from the inside region of the one or more composite oxides having a relatively high oxygen concentration, to the site of the surface having the lowered oxygen concentration, according the oxygen-ion conductivity of the Zr-based composite oxide included in the composite oxides of the catalyst layer. Then, the oxygen ion $O^{2-}$ reaches the surface of the catalyst layer 8 and becomes active oxygen. In this manner, several sites facilitating an oxidation reaction of the carbon 9 are locally created in a surface of the composite oxides.

Then, in one of the sites which optimally meets reactive conditions, an oxidation reaction of the carbon 9 is initiated. As shown in FIG. 5A, upon initiation of the oxidation reaction, a flame kernel 10 is generated in the site. Then, due to the flame kernel 10, oxygen therearound becomes deficient to form an oxygen-deficient space 11. Generally, if an oxygen-deficient state occurs, the oxidation reaction of the carbon 9, i.e., flame intensity, becomes weaker, and the flame kernel 10 will be finally vanished. In the DPF 3 according to this embodiment, the particulate matter oxidation catalyst of the catalyst layer 8 includes the Zr-based composite oxide having the oxygen-ion conductivity. Thus, active oxygen is continuously supplied to the oxygen-deficient space 11 by the function of the Zr-based composite oxide, so that the oxidation reaction of the carbon 9 is accelerated, and a burning area will be gradually expanded around the flame kernel 10.

As above, under an oxygen-excess condition, a difference in oxygen concentration occurs between the oxygen-deficient space 11 and its surroundings, and, based on the difference in oxygen concentration, an imbalance in electric charge occurs between respective microscopic sites in the inside region of the composite oxides of the catalyst layer S. Thus, according to the imbalance in electric charge, oxygen ions are transferred from the sites having a relatively high oxygen concentration to the oxygen-deficient space 11 through the Zr-based composite oxide of the catalyst layer 8. Then, the oxygen ion is released to the oxygen-deficient space 11 in the form of active oxygen, so that binding between carbon 9 and active oxygen, i.e., oxidation/burning of the carbon 9, is accelerated. Therefore, a burning area will be expanded without vanishment of the flame kernel 10 generated in the certain site of the surface of the catalyst layer 8, so that PM, i.e., the carbon 9, can be burnt and converted efficiently within a shorter period of time so as to achieve a higher PM burning rate.

In this embodiment, the non-Ce rare-earth metal R as a trivalent metal is contained in the Zr-based composite oxide. Thus, as shown in FIG. 5B, in a crystal structure of the Zr-based composite oxide, a part of Zr atoms are substituted with atoms of the non-Ce rare-earth metal R (indicated by the black marks in FIG. 5B). That is, a part of a crystal lattice comprised of tetravalent metal atoms are substituted with trivalent metal atoms. Thus, oxygen-defect sites (oxygen ion vacancies) exist therein, and an oxygen ion is transferred through the oxygen ion vacancies.

As is clear from the above mechanism, in the Zr-based composite oxide, as a content ratio of the non-Ce rare earth metal R is increased, i.e., a content ratio of the oxide RO of the non-Ce rare-earth metal R: $(RO/(ZrO_2+RO))$, is increased, the oxygen ion vacancy exists in a larger number, and therefore the PM burning rate becomes higher. It has also been experimentally verified that a larger content ratio of the oxide RO of the non-Ce rare-earth metal R: $(RO/(ZrO_2+RO))$, provides a higher PM burning rate, as will be shown in the after-mentioned Examples.

In the Zr-based composite oxide, if the content ratio of the oxide RO of the non-Ce rare-earth metal R is increased, and a solid solubility of the non-Ce rare-earth metal R in Zr reaches a saturated state, a homogeneous mixed crystal of the Zr-based composite oxide is liable to undergo phase separation, i.e., a change in crystal structure of the Zr-based composite oxide is liable to occur. That is, it was considered that, if the content ratio of the oxide RO of the non-Ce rare-earth metal R is increased, heat resistance is liable to deteriorate. However, the inventors have found that, when the content ratio of the oxide RO of the non-Ce rare-earth metal R is set at a high value ranging from greater than 33 mol % to less than 40 mol %, the crystal structure of the Zr-based composite oxide is slightly changed just after being exposed to high-temperature exhaust gas, but the slightly-changed crystal structure will be subsequently maintained almost without any change. The inventors have also found that the Zr-based composite oxide having the slightly-changed crystal structure provides a higher PM burning rate. If the content ratio of the oxide RO of the rare-earth metal R is 33 mol % or less, the PM burning rate is liable to deteriorate, as described above, although heat resistance is more enhanced to substantially prevent occurrence of phase separation in a homogeneous mixed crystal of the Zr-based composite oxide from undergoing phase separation. Further, if the content ratio of the oxide RO of the non-Ce rare-earth metal R is 40 mol % or more, the crystal structure is highly likely to become unable to be maintained when it is exposed to high-temperature exhaust gas.

Figure 6:
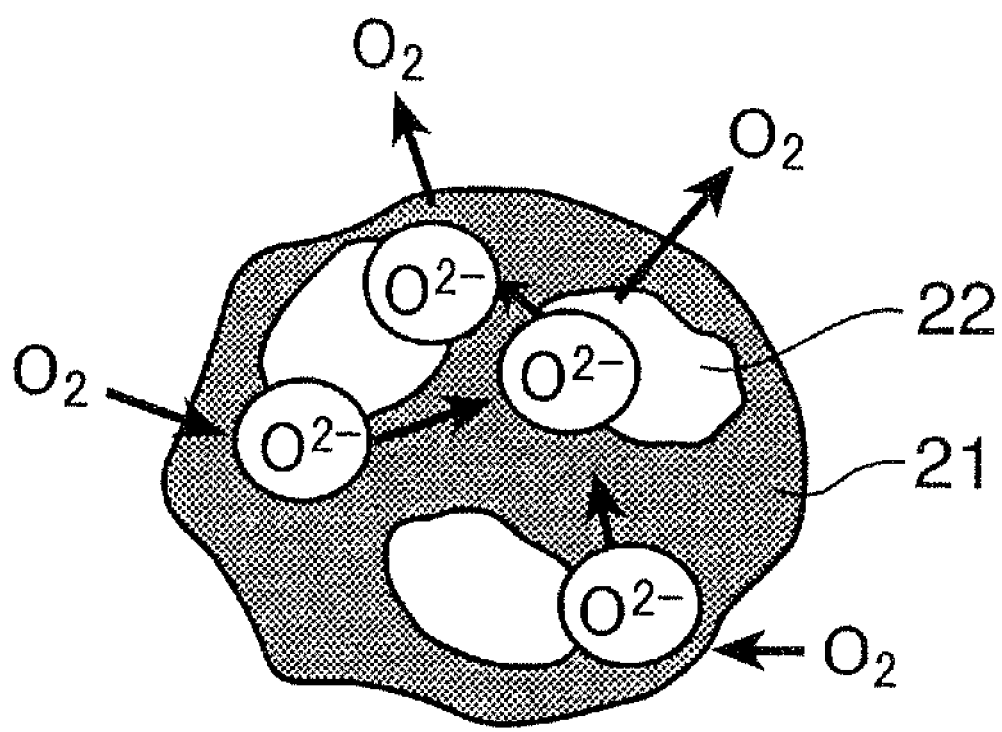
FIG. 6 is an explanatory diagram of a mechanism of a phenomenon that the Zr-based composite oxide provides a higher PM burning rate.

A reason why the Zr-based composite oxide having the slightly-changed crystal structure provides a higher PM burning rate is assumed that there exists the following mechanism. FIG. 6 is an explanatory diagram of a mechanism of the phenomenon that the Zr-based composite oxide provides a higher PM burning rate.

When the Zr-based composite oxide containing the oxide RO of the non-Ce rare-earth metal R in a content ratio of greater than 33 mol % is exposed to high-temperature exhaust gas, a crystal structure of the Zr-based composite oxide is changed such that a separate phase 22 consisting of the oxide RO of the non-Ce rare-earth metal R is finely dispersed over a base phase 21 consisting of the Zr-based composite oxide, as shown in FIG. 6. Thus, it is assumed that, in this crystal structure where the separate phase 22 is dispersed over a base phase 21, the separate phase 22 functions to facilitate conduction of oxygen ions in the Zr-based composite oxide so as to enhance the oxygen-ion conductivity of the Zr-based composite oxide, and therefore the Zr-based composite oxide having the slightly-changed crystal structure provides a higher PM burning rate.

In a state after the Zr-based composite oxide is subjected to a heat treatment at 1000° C. for 6 hours or more, the heat-treated Zr-based composite oxide is identified, by an X-ray diffraction measurement, as a mixed phase comprising a phase of the Zr-based composite oxide, and a phase of the oxide of the non-cerium rare-earth metal. Based on this fact, it can also be assumed that crystal structure of the Zr-based composite oxide is changed such that the separate phase 22 is dispersed over the base phase 21. In addition, even if the crystal structure of the Zr-based composite oxide is changed due to a long-term heat treatment, it will be stably maintained as a mixed phase to suppress a reduction in catalytic efficiency caused by thermal damage of the catalyst layer 8.

As above, in the particulate filter according to this embodiment, the catalyst layer 8 formed on the porous partition wall 5 includes the Zr-based composite oxide in which the content ratio of the oxide RO of the non-Ce rare-earth metal R is set in the range of greater than 33 mol % to less than 40 mol %. Thus, the particulate filter can burn PM within a shorter period of time. In the particulate filter according to this embodiment, the catalyst layer 8 including the Zr-based composite oxide in which the content ratio of the oxide RO of the non-Ce rare-earth metal R is set in the range of greater than 33 mol % to less than 40 mol %, may be formed on the entire surface of the porous partition wall 5, or may be a part of the surface of the porous partition wall 5.

In cases where a second catalyst layer including a Zr-based composite oxide which contains Zr and a non-Ce rare-earth metal R is additionally used, wherein a content ratio of an oxide RO of the non-Ce rare-earth metal R to a total amount of $ZrO_2$ and the oxide RO of the Ce-cerium rare-earth metal R, (i.e., $RO/(ZrO_2+RO)$), is out of the above range, the content ratio of the oxide RO of the non-Ce rare-earth metal R is preferably set to be equal to or less than 40 mol %, at a maximum. Even if the second catalyst layer is used in a region where a temperature of surrounding exhaust gas is relatively low, the content ratio of greater than 40 mol % is liable to cause distraction of a crystal structure of the Zr-based composite oxide and difficulty in ensuring heat resistance.

In the above case where the catalyst layer 8 including the Zr-based composite oxide in which the content ratio of the oxide RO of the non-Ce rare-earth metal R is set in the range of greater than 33 mol % to less than 40 mol %, is formed in a part of the surface of the porous partition wall 5, it is preferably formed on an upstream side where a temperature of surrounding exhaust gas is relatively low, as will be described later in detail. In other words, in the case where the catalyst layer 8 including the Zr-based composite oxide is formed in a part of the surface of the porous partition wall 5, the content ratio of the oxide RO of the non-Ce rare-earth metal R is set at a smaller value when the catalyst layer 8 is formed on a downstream side where a temperature of surrounding exhaust gas is relatively high as compared with when the catalyst layer 8 is formed on an upstream side where a temperature of surrounding exhaust gas is relatively low.

Specifically, as shown in FIG. 3, the catalyst layer is classified into an upstream-side catalyst sublayer formed on a region (upstream region) 6a close to an exhaust inlet of the filter body 6, and a downstream-side catalyst sublayer formed on a region (downstream region) 6b closer to an exhaust outlet of the filter body 6 relative to the upstream region 6a, wherein the content of the oxide RO of the non-Ce rare-earth metal R in the downstream-side catalyst sublayer is set to be less than that of the upstream-side catalyst sublayer.

A ratio of a length (6a) of the upstream region 6a formed with the upstream-side catalyst sublayer to a total length (6a+6b) from the exhaust gas inlet to an exhaust gas outlet of the filter body 6, i.e., 6a/(6a+6b), is preferably set in the range of 20 to 60%, more preferably in the range of 20 to 50%.

Figure 7:
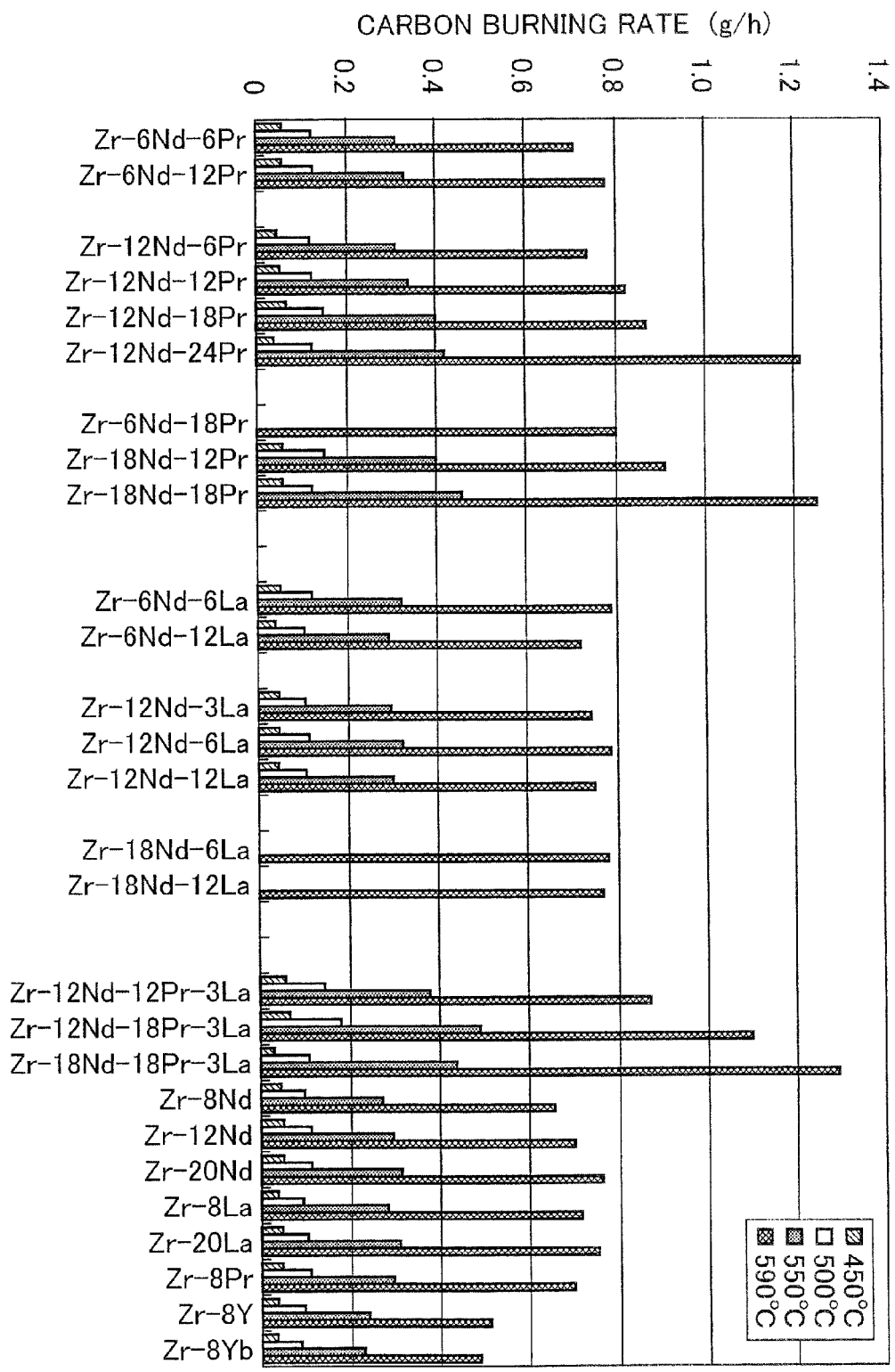
FIG. 7 is a graph showing carbon burning rates in various types of DPFs 3.

Further, the content ratio in the upstream-side catalyst sublayer is preferably set in the range of greater than 33 mol % to less than 40 mol %, more preferably in the range of 36 mol % to less than 40 mol %. If the content ratio is excessively reduced, an exhaust gas temperature around the upstream-side catalyst sublayer is liable to become unable to be desirably increased to cause difficulty in promoting burning of PM. For example, the Zr-based composite oxide for the upstream-side catalyst sublayer may include Zr-12Nd-24Pr, Zr-18Nd-18Pr, Zr-12Nd-18Pr-3La and Zr-18Nd-18Pr-3La, as shown in FIG. 7, wherein Zr-xR means a Zr-based composite oxide which contains x mol % of $R_2O_3$, with the reminder being $ZrO_2$. This representation will also be used in the following description. As a specific example, Zr-12Nd-24Pr means a Zr-based composite oxide which contains 12 mol % of $Nd_2O_3$, and 24 mol % of $Pr_2O_3$, with the reminder being $ZrO_2$.

The content ratio in the downstream-side catalyst sublayer is preferably set in the range of 8 to 33 mol %, more preferably in the range of 8 to 30 mol %. If the content ratio is excessively reduced, an exhaust gas temperature around the downstream-side catalyst sublayer is liable to become unable to be desirably increased to cause difficulty in promoting burning of PM, although the exhaust gas temperature around the downstream-side catalyst sublayer is relatively high. If the content ratio is excessively increased, an advantageous effect to be obtained by disposing a catalyst layer having higher heat resistance to high-temperature exhaust gas is liable to be spoiled.

As above, the upstream-side catalyst sublayer including the Zr-based composite oxide containing the oxide RO of the non-Ce rare-earth metal R in a relatively high content ratio has a relatively high capability to promote burning of PM. Thus, even if the upstream-side catalyst sublayer is formed in the upstream region 6a where an exhaust gas temperature is relatively low, it can efficiently burn PM. Further, based on the burning of PM, the exhaust gas temperature is increased, so that a temperature of exhaust gas to be led to the downstream region 6b can be increased. The downstream-side catalyst sublayer including the Zr-based composite oxide containing the oxide RO of the non-Ce rare-earth metal R in a lower content ratio than that of the upstream-side catalyst sublayer has a relatively high heat resistance, although a PM burning capability is lower than that of the upstream-side catalyst sublayer. Thus, in the downstream region 6b having an exhaust gas temperature increased by the burning of PM in the upstream region 6a, the downstream-side catalyst sublayer can accelerate the burning of PM by utilizing heat from the burning of PM in the upstream region 6a while suppressing thermal damage thereof. This makes it possible to burn PM within a shorter period of time while more effectively suppressing thermal damage of the catalyst layer 8. In addition, the higher PM burning rate makes it possible to provide enhanced fuel economy performance in an engine designed to perform a post-injection control.

The catalyst layer 8 in the above embodiment has been described by taking one type where two catalyst layers consisting of one upstream-side catalyst sublayer and one downstream-side catalyst sublayer are formed in series, as an example. Alternatively, the catalyst layer 8 may consist of three or more catalyst layers as long as the content ratio of the oxide RO of the non-Ce rare-earth metal R in a downstream-side catalyst sublayer is less than that in an upstream-side catalyst sublayer. Further, a slight clearance may be provided between an upstream-side catalyst sublayer and a downstream-side catalyst sublayer. In this case, PM accumulated on the slight clearance region can be sufficiently burnt by heat from burning of PM in the upstream region 6a.

EXAMPLE

The present invention will be more specifically described based on Examples of the DPF 3 according to the above embodiment. It is understood that the present invention is not limited to the following Examples.

Example A

An influence of a composition of a Zr-based composite oxide and/or a content ratio thereof on the PM burning rate was evaluated.

Firstly, a plurality of DPFs 3 different in a composition of a Zr-based composite oxide and/or a content ratio thereof were prepared in the following manner.

As a DPF substrate (filter body 6), a sample having a volume of 25 ml was cut out from a DPF substrate made of silicon carbide (SiC) and formed in a cell structure having a wall thickness (of a porous partition wall 5) of 12 mil, and a cell number of 300 cpsi (cells per square inch).

Then, a plurality of Zr-based composite oxides were prepared in such a manner as to have respective compositions and content ratios thereof as shown in Table 1. Each of the Zr-based composite oxides was obtained through a process of dissolving a given amount of a nitrate salt of each of required ones of a plurality of metal elements (Zr, Nd, Pr, La, etc.) in ion-exchanged water, dropping a basic solution adjusted using ammonia, into the mixture, to form a precipitate including the required metal elements, and subjecting the precipitate to filtering, rinsing with water, drying, and calcination at 500° C. for 2 hours. As to Zr-18Nd-18Pr, an additional Zr-based composite oxide was prepared by calcinating the dried precipitate at 1000° C. for 6 hour.

Then, Pt serving as the catalytic noble metal was supported on each of the Zr-based composite oxides. The Pt was supported on each of the Zr-based composite oxides through a process of adding a nitric acid solution of dinitrodiamine platinum to the Zr-based composite oxide to form a mixture thereof, and subjecting the mixture to evaporation to dryness. A supported amount of the Pt was set at 1 mass % with respect to 100 mass % of the Zr-based composite oxide.

Each of the Pt-supporting Zr-based composite oxides was dried, and then pulverized using a mortar. The obtained powder was subjected to heating and calcination in an ambient atmosphere at 500° C. for 2 hours in an electric furnace to obtain a catalyst power including the Zr-based composite oxide (Pt-supporting composite oxide powder). Then, the Pt-supporting composite oxide powder was subjected to an aging treatment in an ambient atmosphere at 800° C. for a holding time of 24 hours.

Each of the Pt-supporting composite oxide powders subjected to the aging treatment was mixed with water and binder to form a slurry. The filter body 6 appropriately plugged by a plugging portion 15 was coated with the slurry, and dried. In this process, a coating amount of the slurry was adjusted at 20 g/L. Then, the filter body 6 was subjected to calcination in an ambient atmosphere at 500° C. for 2 hours in an electric furnace to obtain a DPF 3 having a catalyst layer 8 formed approximately in the entire region of internal channels of the filter body 6.

Each of the obtained DPFs 3 was subjected to measurement of a carbon burning rate, in the following manner.

(Carbon Burning Rate)

A carbon-burning-rate evaluation test for evaluating a carbon burning capability was carried out under a condition that each of the DPFs 3 was set in a model gas flow-type catalyst evaluation apparatus adapted to allow dummy exhaust gas to pass therethrough.

In this test, a carbon black powder (produced by Sigma-Aldrich Corporation) was accumulated on the DPF 3 as substitute for PM, and the dummy exhaust gas was supplied to the DPF to flow therethrough, while increasing a temperature of the dummy exhaust gas. Then, respective concentrations of $CO_2$ and CO produced through burning of the carbon within the DPF 3 during the above operation were used as a parameter for calculating the carbon burning capability, to evaluate a carbon burning rate. In an operation of accumulating the carbon black powder, 10 cc of ion-exchanged water was added to a given amount of the carbon black powder equivalent to 10 g/L, and the mixture was stirred using a stirrer for 5 minutes to adequately disperse the carbon black powder over the water. Then, an upstream end of the DPF 3 was immersed in the mixture, and simultaneously the mixture was sucked from the opposite side of the immersed end using an aspirator. Then, air was blown into the DPF 3 from the immersed end to remove an excess mixture incapable of being removed by the sucking operation, and the DPF 3 was dried at a temperature of 150° C. for 2 hours.

In the model gas flow-type catalyst evaluation apparatus, under a condition that dummy exhaust gas comprising oxygen gas and water vapor each contained at 10 volume % with respect to a total gas flow volume, with the remainder being nitrogen gas was supplied at a spatial velocity of 50,000/h, while increasing a temperature of the dummy exhaust gas up to 600° C. at a temperature rise rate of 15° C./min, $CO_2$ and CO concentrations at a position just after the outlet of the DPF 3 were measured. Based on the measured $CO_2$ and CO concentrations, a carbon burning rate defined by the following formula was calculated. This carbon burning rate represents an amount of carbon to be burnt per L of the substrate (DPF 3).

Carbon burning rate(g/h) =
$$\left\{ \text{gas flow volume(L/h)} \times \frac{(CO + CO_2) \text{ concentration(ppm)}}{1 \times 10^6} \right\} \times$$
$$12(\text{g/mol}) / 22.4(\text{L/mol})$$

Figure 8:
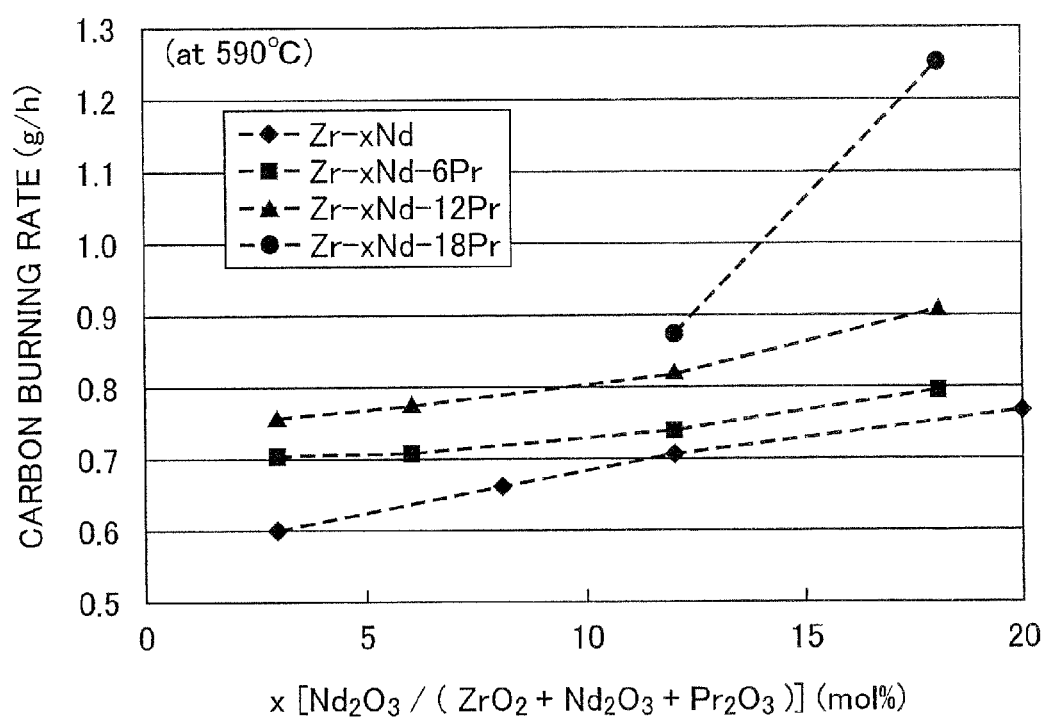
FIG. 8 is a graph showing a change in carbon burning rate along with a change in a content ratio of $Nd_2O_3$ in each of a Zr—Nd composite oxide and a Zr—Nd—Pr composite oxide.

An obtained result is shown in Table 1 and FIGS. 7 and 8, wherein FIG. 7 is a graph showing a carbon burning rate in each of the DPFs 3, and FIG. 8 is a graph showing a change in carbon burning rate along with a change in a content ratio of $Nd_2O_3$ in each of a Zr—Nd composite oxide and a Zr—Nd—Pr composite oxide.

TABLE 1

| | RO/(ZrO$_2$ + RO) (mol %) | CARBON BURNING RATE (g/h) at 590° C. |
|---|---|---|
| Zr—3Nd | 3 | 0.60 |
| Zr—8Nd | 8 | 0.67 |
| Zr—3Nd—6La | 9 | 0.71 |
| Zr—3Nd—6Pr | 9 | 0.71 |
| Zr—3Nd—6Y | 9 | 0.71 |
| Zr—3Nd—6Yb | 9 | 0.72 |
| Zr—3Nd—6Sc | 9 | 0.73 |
| Zr—3Nd—6Sm | 9 | 0.71 |
| Zr—3Nd—3La—3Pr | 9 | 0.73 |
| Zr—12Nd | 12 | 0.70 |
| Zr—6Nd—6La | 12 | 0.72 |
| Zr—6Nd—6Pr | 12 | 0.73 |
| Zr—3Nd—12La | 15 | 0.71 |
| Zr—12Nd—3La | 15 | 0.74 |
| Zr—12Nd—3Pr | 15 | 0.72 |
| Zr—6Nd—12La | 18 | 0.72 |
| Zr—12Nd—6La | 18 | 0.79 |
| Zr—6Nd—12Pr | 18 | 0.78 |
| Zr—12Nd—6Pr | 18 | 0.74 |
| Zr—20Nd | 20 | 0.71 |
| Zr—3Nd—18La | 21 | 0.80 |
| Zr—3Nd—18Pr | 21 | 0.80 |
| Zr—12Nd—12La | 24 | 0.75 |
| Zr—18Nd—6La | 24 | 0.78 |
| Zr—12Nd—12Pr | 24 | 0.82 |
| Zr—12Nd—3La—12Pr | 27 | 0.87 |
| Zr—18Nd—12La | 30 | 0.77 |
| Zr—12Nd—18Pr | 30 | 0.87 |
| Zr—18Nd—12Pr | 30 | 0.91 |
| Zr—12Nd—3La—18Pr | 33 | 1.10 |
| Zr—18Nd—18Pr | 36 | 1.26 |
| Zr—18Nd—18Pr (CALCINATION AT 1000° C. FOR 6 HOURS) | 36 | 1.41 |

As seen in Table 1 and FIGS. 7 and 8, the PM burning speed became higher value along with an increase in the content ratio of the oxide RO of the non-Ce rare-earth metal R in the Zr-based composite oxide. Further, the DPF using the Zr-based composite oxide prepared to contain the oxide RO of the non-Ce rare-earth metal R in a content ratio of greater than 33% and subjected to the calcination at 1000° C. for 6 hours exhibited the highest PM burning rate. From these results, it was proven that, in a DPF comprising a catalyst layer including a Zr-based composite oxide in which the content ratio of the oxide RO of the non-Ce rare-earth metal R is set in the range of greater than 33 mol % to less than 40 mol %, the PM burning rate is improved without deterioration even if it is exposed to high-temperature exhaust gas. In FIG. 7, for example, the DPF using any one of Zr-6Nd-12Pr, Zr-6Nd-6La, Zr-6Nd-12La and Zr-12Nd-6La exhibited a PM burning rate equal to or greater than that in the DPF using Zr-20La, despite the fact that the content ratio of the oxide RO of the non-Ce rare-earth metal R is less than that in Zr-20La. This shows that it is preferable to contain Nd as the non-Ce rare-earth metal R. It is assumed that Nd contained in the Zr-based composite oxide provides further enhanced heat resistance thereto to give rise to the above phenomenon.

Then, a difference between a Pt-supporting composite oxide powder including Zr-18Nd-18Pr, and a Pt-supporting composite oxide powder including Zr-12Nd-18Pr was evaluated.

Figure 9A:
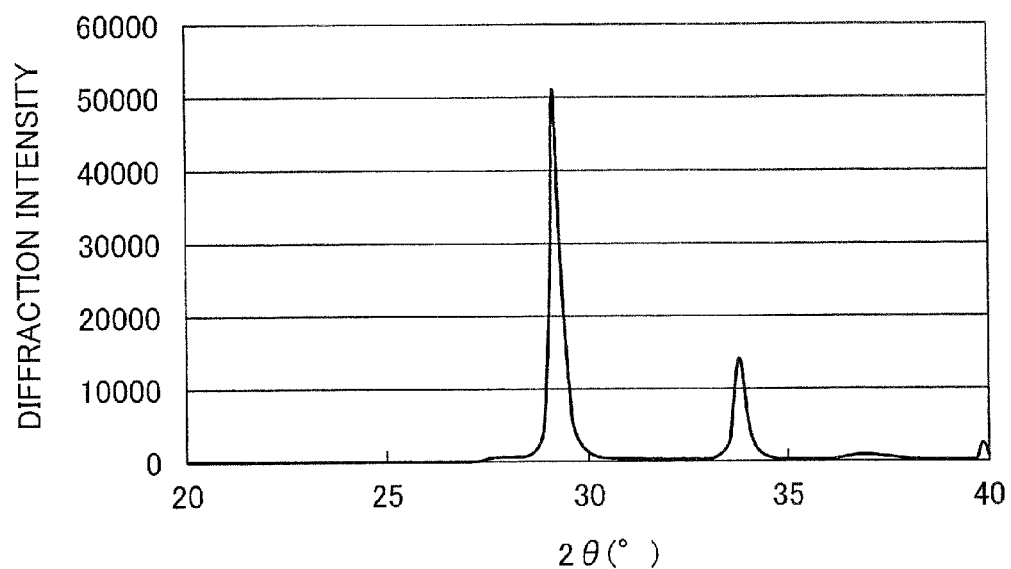
FIG. 9A is a chart showing an X-ray diffraction measurement result on a Pt-supporting composite oxide powder including Zr-12Nd-18Pr.
Figure 9B:
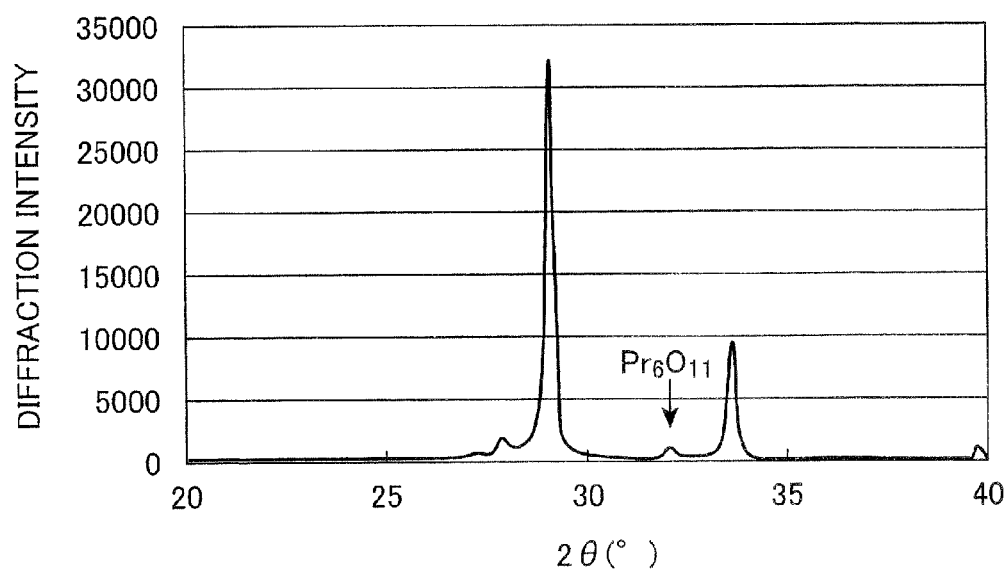
FIG. 9B is a chart showing an X-ray diffraction measurement result on a Pt-supporting composite oxide powder including Zr-18Nd-18Pr.

Firstly, each of these catalyst powders was subjected to an aging treatment in an ambient atmosphere at 1000° C. for 24 hours. Then, each of the catalyst powders subjected to the aging treatment was subjected to X-ray diffraction (XRD) measurement. FIG. 9A is a chart showing an X-ray diffraction measurement result on the Pt-supporting composite oxide powder including Zr-12Nd-18Pr. FIG. 9B is a chart showing an X-ray diffraction measurement result on the Pt-supporting composite oxide powder including Zr-18Nd-18Pr.

As seen in FIG. 9A, the catalyst power including the Zr-based composite oxide which contains the non-Ce rare-earth metal R at a ratio of 33 mol % or less exhibits a sharp peak. This shows that a crystal lattice of this Zr-based composite oxide is maintained even under a high temperature condition (1000° C.).

As seen in FIG. 9B, although the catalyst power including the Zr-based composite oxide which contains the non-Ce rare-earth metal R at a ratio of greater than 33 mol % exhibits a sharp peak, a small peak based on $Pr_6O_{11}$ also appears. This shows that a homogeneous mixed crystal of this Zr-based composite oxide undergoes phase separation under a high temperature condition (1000° C.).

Based on peak positions (2θ=28.3 degrees and 32.7 degrees) of $Pr_6O_{11}$, a crystallite diameter of $Pr_6O_{11}$ was calculated using the Scherrer equation. As a result, the crystallite diameter of $Pr_6O_{11}$ was 20 nm. In contrast, a crystallite diameter of $Pr6O_{11}$ obtained by calcinating $Pr_2O_3$ at 1000° C. was calculated as 150 nm by the same calculation technique. This shows that, when the catalyst power including the Zr-based composite oxide which contains the non-Ce rare-earth metal R at a ratio of greater than 33 mol % is subjected to calcination at a high temperature, a separate phase of $Pr_6O_{11}$ is finely dispersed over a base phase of the Zr-based composite oxide.

In view of the above results, it is considered that the separate phase finely dispersed over the base phase enhances the oxygen-ion conductivity of the Zr-based composite oxide to provide a higher PM burning rate, as mentioned above.

Example B

Further, the PM burning rate and others were evaluated using Zr-18Nd-18Pr and Zr-12Nd-18Pr.

Inventive Example 1

A DPF 3 having a catalyst layer including Zr-18Nd-18Pr formed on the entire surface of a filter body was prepared in the following manner.

As a DPF substrate (filter body 6), a sample having a volume of 25 ml (diameter: 25.4 mm) was cut out from a DPF substrate made of silicon carbide (SiC) and formed in a cell structure having a wall thickness (of a porous partition wall 5) of 16 mil, and a cell number of 178 cpsi (cells per square inch).

Then, Zr-18Nd-18Pr, Zr-23Ce-4Nd, and La-containing alumina prepared to contain $La_2O_3$ in an amount of 5 mass % and $Al_2O_3$ in an amount of 95 mass %, were mixed together at a mass ratio of 2:1:6, to obtain a catalyst material.

Then, Pt serving as the catalytic noble metal was supported on the catalyst material. The Pt was supported on the catalyst material through a process of adding a nitric acid solution of dinitrodiamine platinum to the catalyst material to form a mixture thereof, and subjecting the mixture to evaporation to dryness. A supported amount of the Pt was set at 1.5 g/L of the catalyst material.

The catalyst material was dried, and then pulverized using a mortar. The obtained powder was subjected to heating and calcination in an ambient atmosphere at 500° C. for 2 hours in an electric furnace to obtain a catalyst power including the Zr-based composite oxides (Pt-supporting composite oxide powder).

The Pt-supporting composite oxide powder was mixed with water and binder to form a slurry. The filter body 6 appropriately plugged by a plugging portion 15 was coated with the slurry, and dried. In this process, a coating amount of the slurry was adjusted at 20 g/L. Then, the filter body 6 was subjected to calcination in an ambient atmosphere at 500° C. for 2 hours in an electric furnace to obtain a DPF 3 having a catalyst layer 8 formed approximately in the entire region of internal channels of the filter body 6.

Inventive Example 2

A DPF 3 having a catalyst layer including Zr-18Nd-18Pr formed on an upstream region of a filter body was prepared in the following manner.

As a DPF substrate (filter body 6), a sample having a volume of 25 ml was cut out from a DPF substrate made of silicon carbide (SiC) and formed in a cell structure having a wall thickness (of a porous partition wall 5) of 16 mil, and a cell number of 178 cpsi (cells per square inch).

Then, Zr-18Nd-18Pr, Zr-23Ce-4Nd, and La-containing alumina prepared to contain $La_2O_3$ in an amount of 5 mass % and $Al_2O_3$ in an amount of 95 mass %, were mixed together at a mass ratio of 2:1:6, to obtain a catalyst material.

Then, Pt serving as the catalytic noble metal was supported on the catalyst material. The Pt was supported on the catalyst material through a process of adding a nitric acid solution of dinitrodiamine platinum to the catalyst material to form a mixture thereof, and subjecting the mixture to evaporation to dryness. A supported amount of the Pt was set at 1.8 g/L of the catalyst material.

The catalyst material was dried, and then pulverized using a mortar. The obtained powder was subjected to heating and calcination in an ambient atmosphere at 500° C. for 2 hours in an electric furnace to obtain a catalyst power including the Zr-based composite oxides (Pt-supporting composite oxide powder).

The Pt-supporting composite oxide powder was mixed with water and binder to form a slurry. The filter body 6 appropriately plugged by a plugging portion 15 was coated with the slurry in a region ranging from an upstream end to 50% of the overall length from the upstream end to a downstream end thereof, and dried. In this process, a coating amount of the slurry was adjusted at 20 g/L. Then, the filter body 6 was subjected to calcination in an ambient atmosphere at 500° C. for 2 hours in an electric furnace to obtain a DPF 3 having a catalyst layer 8 formed on the upstream region of internal channels of the filter body 6.

Comparative Example 1

A DPF 3 having a catalyst layer including Zr-12Nd-18Pr formed on the entire surface of a filter body was prepared in the following manner.

As a DPF substrate (filter body 6), a sample having a volume of 25 ml was cut out from a DPF substrate made of silicon carbide (SiC) and formed in a cell structure having a wall thickness (of a porous partition wall 5) of 16 mil, and a cell number of 178 cpsi (cells per square inch).

Then, Zr-12Nd-18Pr, Zr-23Ce-4Nd, and La-containing alumina prepared to contain $La_2O_3$ in an amount of 5 mass % and $Al_2O_3$ in an amount of 95 mass %, were mixed together at a mass ratio of 2:1:6, to obtain a catalyst material.

Then, Pt serving as the catalytic noble metal was supported on the catalyst material. The Pt was supported on the catalyst material through a process of adding a nitric acid solution of dinitrodiamine platinum to the catalyst material to form a mixture thereof, and subjecting the mixture to evaporation to dryness. A supported amount of the Pt was set at 1.8 g/L of the catalyst material.

The catalyst material was dried, and then pulverized using a mortar. The obtained powder was subjected to heating and calcination in an ambient atmosphere at 500° C. for 2 hours in an electric furnace to obtain a catalyst power including the Zr-based composite oxides (Pt-supporting composite oxide powder).

The Pt-supporting composite oxide powder was mixed with water and binder to form a slurry. The filter body 6 appropriately plugged by a plugging portion 15 was coated with the slurry, and dried. In this process, a coating amount of the slurry was adjusted at 20 g/L. Then, the filter body 6 was subjected to calcination in an ambient atmosphere at 500° C. for 2 hours in an electric furnace to obtain a DPF 3 having a catalyst layer 8 formed approximately in the entire region of internal channels of the filter body 6.

A carbon burning capability and an exhaust gas conversion efficiency (light-off temperature, high-temperature conversion efficiency) were evaluated for each of the obtained DPFs, in the following manner.

(Carbon Burning Capability)

A carbon-burning-time evaluation test for evaluating a carbon burning capability was carried out under a condition that each of the DPFs 3 was set in a model gas flow-type catalyst evaluation apparatus adapted to allow dummy exhaust gas to pass therethrough.

In this test, a carbon black powder (produced by Sigma-Aldrich Corporation) was accumulated on the DPF 3 as substitute for PM, and the dummy exhaust gas was supplied to the DPF to flow therethrough, while increasing a temperature of the dummy exhaust gas. Then, respective concentrations of $CO_2$ and CO produced through burning of the carbon within the DPF 3 during the above operation were used as a parameter for calculating the carbon burning capability, to evaluate the carbon burning time. In an operation of accumulating the carbon black powder, 10 cc of ion-exchanged water was added to a given amount of the carbon black powder equivalent to 5 g/L, and the mixture was stirred using a stirrer for 5 minutes to adequately disperse the carbon black powder over the water. Then, an upstream end of the DPF 3 was immersed in the mixture, and simultaneously the mixture was sucked from the opposite side of the immersed end using an aspirator. Then, air was blown into the DPF 3 from the immersed end to remove an excess mixture incapable of being removed by the sucking operation, and the DPF 3 was dried at a temperature of 150° C. for 2 hours.

In the model gas flow-type catalyst evaluation apparatus, nitrogen gas was supplied while increasing a temperature thereof until a temperature at an inlet of the DPF 3 was increased up to 580° C. or 640° C. Then, under a condition that dummy exhaust gas comprising oxygen and NOx each contained, respectively, at 10 volume % and 300 ppm with respect to a total gas flow volume, with the remainder being nitrogen gas, was supplied at a spatial velocity of 40,000/h, CO and $CO_2$ concentrations at a position just after an outlet of the DPF 3 were measured in a time series manner. Based on the measured CO and $CO_2$ concentrations, a carbon burning rate defined by the aforementioned formula was calculated, and a cumulative value of an amount of burnt carbon every second. Then, a time period required for burning 90% of carbon was determined based on the cumulative value, and the determined time period was defined as a carbon burning time.

Figure 10:
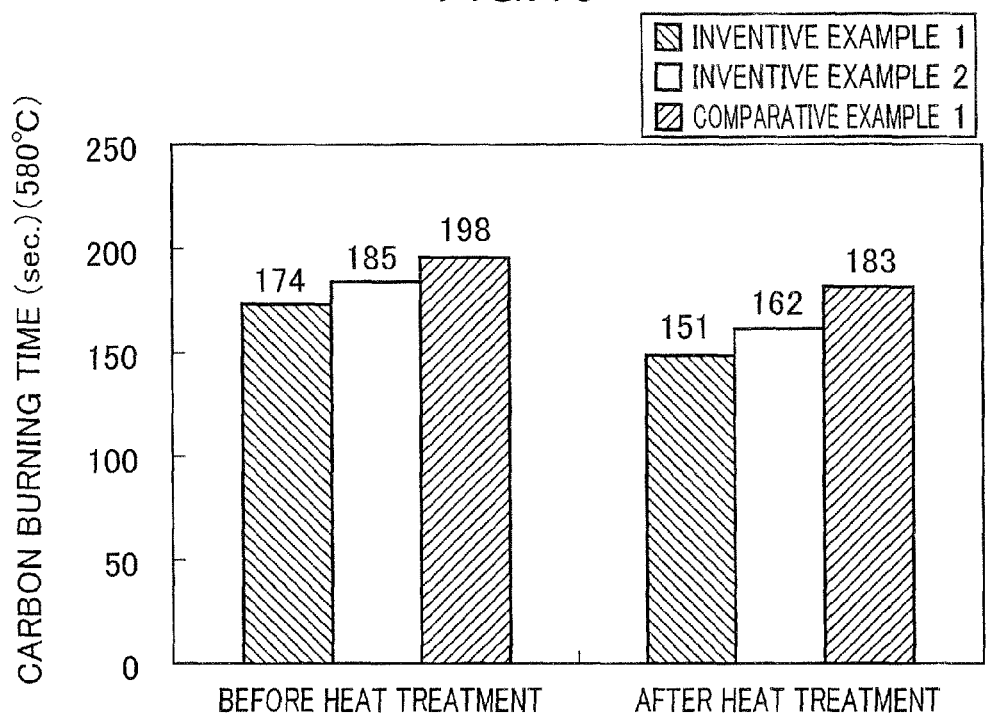
FIG. 10 is a graph showing a measurement result on a carbon burning time under a condition that a temperature at an inlet of the DPF 3 is set at 640° C.
Figure 11:
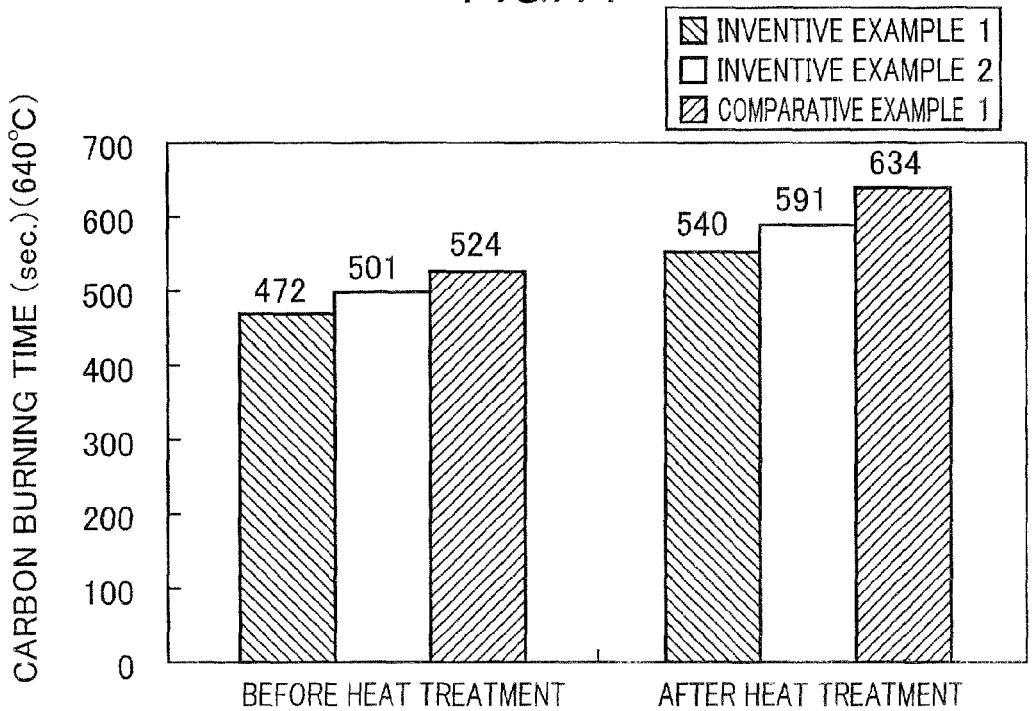
FIG. 11 is a graph showing a measurement result on a carbon burning time under a condition that the temperature at the inlet of the DPF 3 is set at 580° C.

A result of the above test is shown in FIGS. 10 and 11. FIG. 10 is a graph showing a measurement result on a carbon burning time under a condition that a temperature at the inlet of the DPF 3 is set at 640° C. FIG. 11 is a graph showing a measurement result on a carbon burning time under a condition that the temperature at the inlet of the DPF 3 is set at 580° C. In each of FIGS. 10 and 11, respective measurement results obtained using two type of DPFs 3: one type pre-subjected to a heat treatment in an ambient temperature at 800° C. for a holding time of 24 hours; and the other type obtained without the heat treatment, are shown together.

As seen in FIGS. 10 and 11, it is proven that each of the DPFs in Inventive Examples 1 and 2 using the Zr-based composite oxide in which the content ratio of the oxide RO of the non-Ce rare-earth metal R is set in the range of greater than 33 mol % to less than 40 mol %, exhibits a shorter carbon burning time than that of the DPF in Comparative Example 1 using the Zr-based composite oxide in which the content ratio of the oxide RO of the non-Ce rare-earth metal R is set at 33 mol % or less.

(Exhaust Gas Conversion Efficiency)

As an exhaust gas conversion efficiency, a light-off temperature and a high-temperature conversion efficiency were measured. In an evaluation test, each of the DPFs 3 was set in a model gas flow-type catalyst evaluation apparatus, and dummy exhaust gas was supplied at a spatial velocity of 50,000/h, while increasing a temperature of the dummy exhaust at a temperature rise rate of 15° C./min. The dummy exhaust gas was comprised of oxygen gas ($O_2$), water vapor ($H_2O$), nitrogen monoxide gas (NO), hydrocarbon (propylene: $C_3H_6$) and carbon monoxide gas (CO), with the remainder being nitrogen ($N_2$), which, except the remainder, were contained, respectively, at 10 volume %, 10 volume %, 100 ppm, 200 ppm (as converted to carbon) and 400 ppm.

As the light-off temperature, a temperature of the dummy exhaust gas at an inlet of the DPF 3 was measured at each time when HC concentration was reduced to 50% and CO concentration was reduced to 50%.

Figure 12:
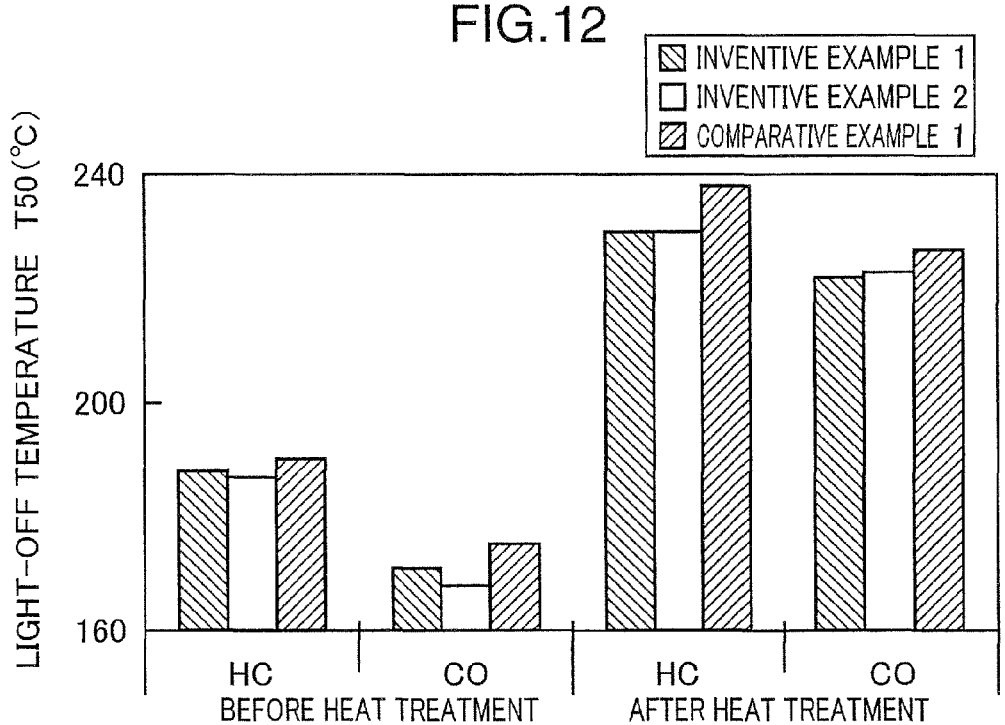
FIG. 12 is a graph showing a measurement result on a light-off temperature.

A result of the above measurement is shown in FIG. 12. In FIG. 12, respective measurement results obtained using two type of DPFs 3: one type pre-subjected to a heat treatment in an ambient temperature at 800° C. for a holding time of 24 hours; and the other type obtained without the heat treatment, are shown together. As seen in FIG. 12, it is proven that each of the DPFs in Inventive Examples 1 and 2 using the Zr-based composite oxide in which the content ratio of the oxide RO of the non-Ce rare-earth metal R is set in the range of greater than 33 mol % to less than 40 mol %, exhibits a lower light-off temperature, i.e., enhanced exhaust conversion efficiency, as compared with the DPF in Comparative Example 1 using the Zr-based composite oxide in which the content ratio of the oxide RO of the non-Ce rare-earth metal R is set at 33 mol % or less.

Further, as the high-temperature conversion efficiency, HC conversion efficiency and CO conversion efficiency at a position just after an outlet of the DPF 3 were measured at a time when a temperature of the dummy exhaust gas at the inlet of the DPF 3 was increased up to 400° C.

Figure 13:
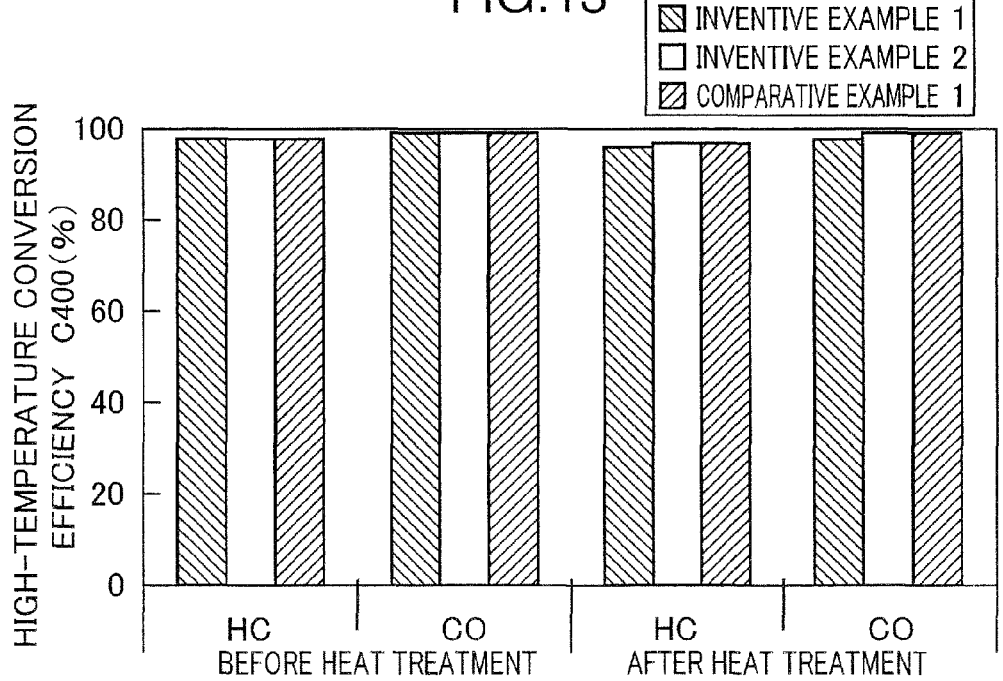
FIG. 13 is a graph showing a measurement result on a high-temperature conversion efficiency.

A result of the above measurement is shown in FIG. 13. In FIG. 13, respective measurement results obtained using two type of DPFs 3: one type pre-subjected to a heat treatment in an ambient temperature at 800° C. for a holding time of 24 hours; and the other type obtained without the heat treatment, are shown together. As seen in FIG. 12, it is proven that there is not a significant difference between the respective DPFs in Inventive Examples 1 and 2 and Comparative Example 1.

Example C

A technique of changing the content ratio of the oxide RO of the non-Ce rare-earth metal R in a Zr-based composite oxide between upstream-side and downstream-side catalyst sublayers was evaluated.

Inventive Example 3

As a DPF substrate (filter body 6), a sample having a volume of 25 ml (diameter: 25.4 mm) was cut out from a DPF substrate made of silicon carbide (SiC) and formed in a cell structure having a wall thickness (of a porous partition wall 5) of 12 mil, and a cell number of 300 cpsi (cells per square inch).

Then, two types of Zr-based composite oxides (Zr-18Nd-18Pr and Zr-12Nd-18Pr) were prepared. Each of the Zr-based composite oxides was obtained through a process of dissolving a given amount of a nitrate salt of each of required three metal elements (Zr, Nd, Pr) in ion-exchanged water, dropping a basic solution adjusted using ammonia, into the mixture, to form a precipitate including the required metal elements, and subjecting the precipitate to filtering, rinsing with water, drying, and calcination at 500° C. for 2 hours to obtain the two Zr-based composite oxides. Then, Pt serving as the catalytic noble metal was supported on each of the Zr-based composite oxides. The Pt was supported on each of the Zr-based composite oxides through a process of adding a nitric acid solution of dinitrodiamine platinum to the Zr-based composite oxide to form a mixture thereof, and subjecting the mixture to evaporation to dryness. A supported amount of the Pt was set at 1 mass % with respect to 100 mass % of the Zr-based composite oxide.

Each of the Pt-supporting Zr-based composite oxides was dried, and then pulverized using a mortar. The obtained powder was subjected to heating and calcination in an ambient atmosphere at 500° C. for 2 hours in an electric furnace to obtain a Zr-based catalyst power including the Zr-based composite oxide (Pt-supporting composite oxide powder). Specifically, a Zr-based catalyst power including Zr-18Nd-18Pr, and a Zr-based catalyst power including Zr-12Nd-18Pr, were obtained as an upstream-side catalyst power and a downstream-side catalyst power, respectively.

In order to simulate a difference in heat receiving between upstream-side and downstream-side catalyst sublayers, the upstream-side catalyst power was subjected to an aging treatment in an ambient atmosphere at 800° C. for a holding time of 24 hours, and the downstream-side catalyst power was subjected to an aging treatment in an ambient atmosphere at 1000° C. for a holding time of 24 hours.

Each of the Pt-supporting composite oxide powders each subjected to the different aging treatment was mixed with water and binder to form a slurry. The filter body 6 appropriately plugged by a plugging portion 15 was coated with the slurry including the upstream-side catalyst power in a region ranging from an upstream end to 20% of the overall length from the upstream end to a downstream end thereof, and dried. Then, the filter body 6 was further coated with the slurry including the downstream-side catalyst power in the remaining region, and dried. In this process, respective coating amounts of the upstream-side and downstream-side catalyst sublayers were determined in such a manner that 20 g/L is distributed in accordance with an area ratio between the upstream and downstream regions. In this embodiment, the ratio of the upstream region to the downstream region is 20% to 80%, and therefore a coating amount of the upstream-side catalyst sublayer and a coating amount of the downstream-side catalyst sublayer are set at 4 g/L and 16 g/L, respectively. Then, the filter body 6 was subjected to calcination in an ambient atmosphere at 500° C. for 2 hours in an electric furnace to form the DPF 3 according to the aforementioned embodiment, which has a catalyst layer 8 formed approximately in the entire region of internal channels of the filter body 6 (specifically, has Zr-18Nd-18Pr formed in the upstream region (20%), and Zr-12Nd-18Pr formed in the downstream region (80%)).

Inventive Example 4

Except that the filter body 6 was coated with the slurry including the upstream-side catalyst power, in a region ranging from the upstream end to 40% of the entire length, a DPF in Inventive Example 4 was prepared in the same manner as that in Inventive Example 3 (i.e., Zr-18Nd-18Pr was formed in the upstream region (40%), and Zr-12Nd-18Pr was formed in the downstream region (60%)).

Inventive Example 5

Except that the filter body 6 was coated with the slurry including the upstream-side catalyst power, in a region ranging from the upstream end to 50% of the entire length, a DPF in Inventive Example 5 was prepared in the same manner as that in Inventive Example 3 (i.e., Zr-18Nd-18Pr was formed in the upstream region (50%), and Zr-12Nd-18Pr was formed in the downstream region (50%)).

Inventive Example 6

Except that the filter body 6 was coated with the slurry including the upstream-side catalyst power, in a region ranging from the upstream end to 60% of the entire length, a DPF in Inventive Example 6 was prepared in the same manner as that in Inventive Example 3 (i.e., Zr-18Nd-18Pr was formed in the upstream region (60%), and Zr-12Nd-18Pr was formed in the downstream region (40%)).

Inventive Example 7

Except that Zr-12Nd-24Pr was used in place of Zr-18Nd-18Pr, a DPF in Inventive Example 7 was prepared in the same manner as that in Inventive Example 4 (i.e., Zr-12Nd-24Pr was formed in the upstream region (40%), and Zr-12Nd-18Pr was formed in the downstream region (60%)).

Inventive Example 8

Except that Zr-18Nd-18Pr-3La was used in place of Zr-18Nd-18Pr, a DPF in Inventive Example 8 was prepared in the same manner as that in Inventive Example 4 (i.e., Zr-18Nd-18Pr-3La was formed in the upstream region (40%), and Zr-12Nd-18Pr was formed in the downstream region (60%)).

Inventive Example 9

Except that Zr-12Nd was used in place of Zr-12Nd-18Pr, a DPF in Inventive Example 9 was prepared in the same manner as that in Inventive Example 4 (i.e., Zr-18Nd-18Pr was formed in the upstream region (40%), and Zr-12Nd was formed in the downstream region (60%)).

Inventive Example 10

Except that Zr-12Nd-12Pr was used in place of Zr-12Nd-18Pr, a DPF in Inventive Example 10 was prepared in the same manner as that in Inventive Example 4 (i.e., Zr-18Nd-18Pr was formed in the upstream region (40%), and Zr-12Nd-12Pr was formed in the downstream region (60%)).

Inventive Example 11

Except that Pt-supporting $Ce_{0.25}Zr_{0.75}O_2$ (supported amount of Pt: 1 mass % with respect to 100 mass % of $CeO_{0.25}Zr_{0.75}O_2$) and Pt-supporting alumina (supported amount of Pt: 1 mass % with respect to 100 mass % of alumina) were mixed in each of the upstream-side and downstream-side catalyst powders, a DPF in Inventive Example 11 was prepared in the same manner as that in Inventive Example 4.

Comparative Example 2

Except that the entire surface of the filter body 6 was coated with the slurry including the downstream-side catalyst powder in Inventive Example 1, a DPF in Comparative Example 2 was prepared in the same manner as that in Inventive Example 3 (i.e., uniform coating of Zr-12Nd-18Pr).

Comparative Example 3

Except that the entire surface of the filter body 6 was coated with a slurry including a mixture of the downstream-side catalyst powder in Inventive Example 1, Pt-supporting $Ce_{0.25}Zr_{0.75}O_2$ (supported amount of Pt: 1 mass % with respect to 100 mass % of $Ce_{0.25}Zr_{0.75}O_2$), and Pt-supporting alumina (supported amount of Pt: 1 mass % with respect to 100 mass % of alumina), a DPF in Comparative Example 3 was prepared in the same manner as that in Inventive Example 3.

(Carbon Burning Capability)

A carbon-burning-rate evaluation test for evaluating a carbon burning capability was carried out under a condition that each of each of the DPFs 3 in Inventive Examples 3 to 10 and Comparative Example 2 was set in a model gas flow-type catalyst evaluation apparatus adapted to allow dummy exhaust gas to pass therethrough.

In this test, a carbon black powder (produced by Sigma-Aldrich Corporation) was accumulated on the DPF 3 as substitute for PM, and the dummy exhaust gas was supplied to the DPF to flow therethrough, while increasing a temperature of the dummy exhaust gas. Then, respective concentrations of $CO_2$ and CO produced through burning of the carbon within the DPF 3 during the above operation were used as a parameter for calculating the carbon burning capability, to evaluate a carbon burning rate. In an operation of accumulating the carbon black powder, 10 cc of ion-exchanged water was added to a given amount of the carbon black powder equivalent to 10 g/L, and the mixture was stirred using a stirrer for 5 minutes to adequately disperse the carbon black powder over the water. Then, an upstream end of the DPF 3 was immersed in the mixture, and simultaneously the mixture was sucked from the opposite side of the immersed end using an aspirator. Then, air was blown into the DPF 3 from the immersed end to remove an excess mixture incapable of being removed by the sucking operation, and the DPF 3 was dried at a temperature of 150° C. for 2 hours.

In the model gas flow-type catalyst evaluation apparatus, under a condition that dummy exhaust gas comprising oxygen gas and water vapor each contained at 10 volume % with respect to a total gas flow volume, with the remainder being nitrogen gas was supplied at a spatial velocity of 50,000/h, while increasing a temperature of the dummy exhaust gas up to 600° C. at a temperature rise rate of 15° C./min, CO and $CO_2$ concentrations at a position just after an outlet of the DPF 3 were measured. Based on the measured CO and $CO_2$ concentrations, a carbon burning rate defined by the aforementioned formula was calculated. This carbon burning rate represents an amount of carbon to be burnt per L of the substrate (DPF 3).

Figure 14:
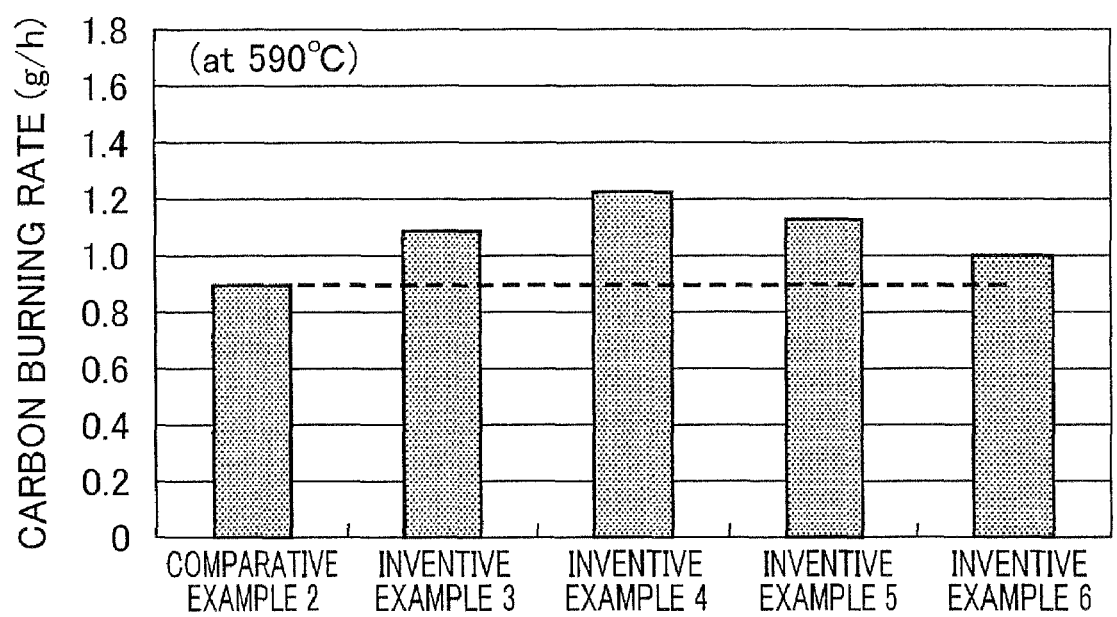
FIG. 14 is a graph showing a measurement result on a carbon burning rate obtained under a condition that a ratio of a length of an upstream-side catalyst sublayer to an overall length of a filter body in a direction of an exhaust gas stream is changed.
Figure 15:
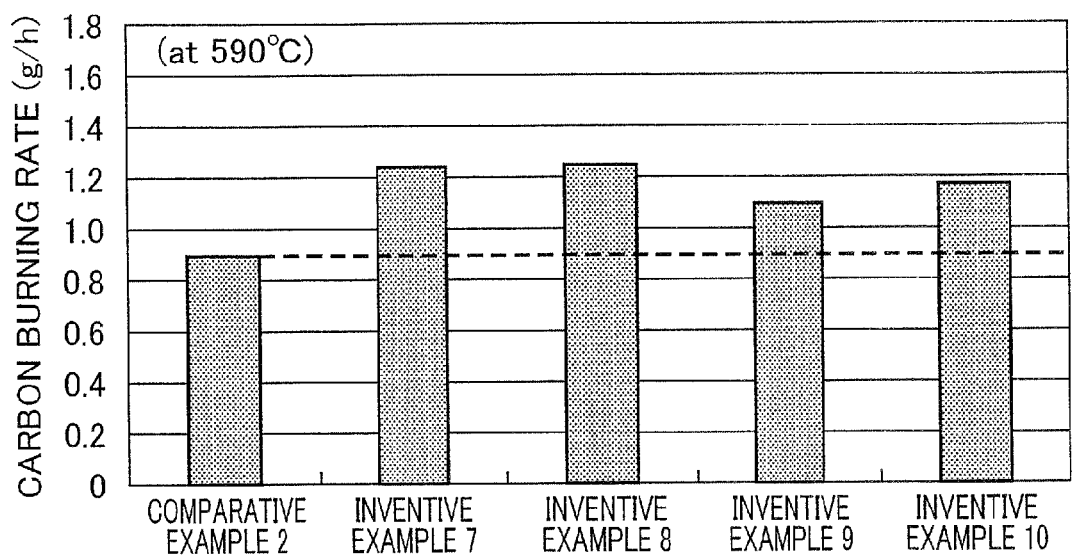
FIG. 15 is a graph showing a measurement result on a carbon burning rate obtained under a condition that respective compositions of the upstream-side catalyst sublayer and a downstream-side catalyst sublayer are changed.

A result of the above measurement is shown in FIGS. 14 and 15, wherein FIG. 14 is a graph showing a measurement result on a carbon burning rate obtained under a condition that a ratio of a length of the upstream-side catalyst sublayer to the overall length of the filter body 6 in the direction of the exhaust gas stream is changed, and FIG. 15 is a graph showing a measurement result on a carbon burning rate obtained under a condition that respective compositions of the upstream-side catalyst sublayer and the downstream-side catalyst sublayer are changed.

As seen in FIGS. 14 and 15, it is proven that each of the DPFs in Inventive Examples 3 to 10 in which the content ratio of the oxide RO of the non-Ce rare-earth metal R in the downstream-side catalyst sublayer is less than that in the upstream-side catalyst sublayer, exhibits a higher carbon burning rate than that of the DPF in Comparative Example 2 in which the catalyst layer having the same composition is formed on the entire surface of the filter body 6.

(Light-Off Temperature)

Each of the DPFs 3 in Inventive Example 11 and Comparative Example 3 was set in a model gas flow-type catalyst evaluation apparatus, and dummy exhaust gas was supplied at a spatial velocity of 50,000/h, while increasing a temperature of the dummy exhaust at a temperature rise rate of 15° C./min. Then, a temperature of the dummy exhaust gas at an inlet of the DPF 3 was measured at each time when HC concentration was reduced to 50% and CO concentration was reduced to 50%. In this measurement, the dummy exhaust gas was comprised of oxygen gas ($O_2$), water vapor ($H_2O$), nitrogen monoxide gas (NO), hydrocarbon (propylene: $C_3H_6$), carbon monoxide gas (CO), and nitrogen ($N_2$), which were contained, respectively, at 10 volume %, 10 volume %, 300 ppm, 200 ppm (as converted to carbon), 400 ppm, and the remaining quantity, with respect to a total gas flow volume.

Figure 16:
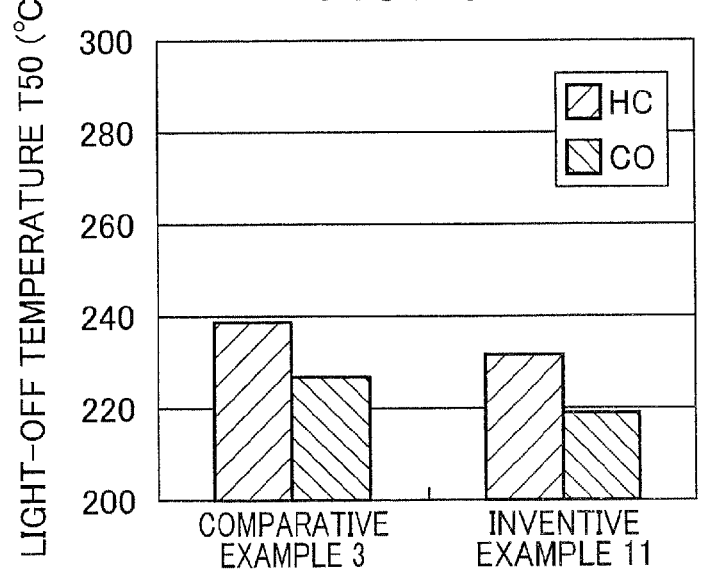
FIG. 16 is a graph showing a measurement result on a light-off temperature.

A result of the measurement on light-off temperature is shown in FIG. 16. As seen in FIG. 16, the DPF in Inventive Example 11 in which the catalyst layer includes the Pt-supporting alumina and the Ce—Zr-based composite oxide, and the content ratio of the oxide RO of the non-Ce rare-earth metal R in the downstream-side catalyst sublayer of the catalyst layer is less than that in the upstream-side catalyst sublayer of the catalyst layer, exhibits a lower light-off temperature, i.e., enhanced exhaust gas conversion efficiency, as compared with the DPF in Comparative Example 3 in which the Zr-based composite oxide of the downstream-side catalyst sublayer in Inventive Example 11 is formed on the entire surface of the filter body 6.

In view of the above results, it is proven that the Zr-based composite oxide containing the oxide RO of the non-Ce rare-earth metal R at a relatively high ratio is suitable for the upstream region having a relatively low exhaust gas temperature, and the Zr-based composite oxide containing the oxide RO of the non-Ce rare-earth metal R at a relatively low ratio is suitable for the downstream region having a relatively high exhaust gas temperature.

As described above in detail, according to one aspect of the present invention, there is provided a particulate filter adapted to be disposed in an exhaust passage of an engine to trap particulate matter contained in exhaust gas discharged from the engine. The particulate filter comprises a filter body having a porous partition wall which defines a plurality of exhaust gas channels allowing the exhaust gas to pass therethrough, and a catalyst layer formed on a surface of the porous partition wall. The catalyst layer includes a Zr-based composite oxide which contains zirconium (Zr), and a rare-earth metal except cerium, wherein a content ratio of an oxide of the non-cerium rare-earth metal to a total amount of $ZrO_2$ and the oxide of the non-cerium rare-earth metal in the Zr-based composite oxide is set in the range of greater than 33 mol % to less than 40 mol %.

It was considered that, although a content ratio of an oxide of a rare-earth metal except cerium (i.e., non-Ce rare-earth metal) in a Zr-based composite oxide included in a catalyst layer may be increased to obtain a higher PM burning rate, a crystal structure of the Zr-based composite oxide is liable to be changed, and consequently heat resistance deteriorates to cause thermal damage of the catalyst layer and a reduction in catalytic efficiency. However, the inventors have found that, when the content ratio of the oxide of the non-Ce rare-earth metal is set in the above specific range, a crystal structure of the Zr-based composite oxide is slightly changed just after being exposed to high-temperature exhaust gas, but the slightly-changed crystal structure will be subsequently maintained almost without any change. The inventors have also found that the Zr-based composite oxide having the slightly-changed crystal structure provides a higher PM burning rate.

Thus, the particulate filter of the present invention can achieve a higher PM burning rate to burn PM within a shorter period of time. In addition, the higher PM burning rate makes it possible to provide enhanced fuel economy performance in an engine designed to perform a post-injection control.

Preferably, in a state after the Zr-based composite oxide is subjected to a heat treatment at 1000° C. for 6 hours or more, the heat-treated Zr-based composite oxide is identified, by an X-ray diffraction measurement, as a mixed phase comprising a phase of the Zr-based composite oxide, and a phase of the oxide of the non-cerium rare-earth metal.

This Zr-based composite oxide can provide a higher PM burning rate to burn PM within a shorter period of time, as mentioned above. The reason is assumed that there exists the following mechanism. It is assumed that, in the above Zr-based composite oxide, a separate phase consisting of the oxide of the non-Ce rare-earth metal is dispersed over a phase consisting of the Zr-based composite oxide. Thus, it is assumed that, in this crystal structure where the phase consisting of the non-Ce rare-earth metal is dispersed over the phase consisting of the Zr-based composite oxide, the phase consisting of the non-Ce rare-earth metal functions to facilitate conduction of oxygen ions in the Zr-based composite oxide so as to enhance the oxygen-ion conductivity of the Zr-based composite oxide.

In a state after the Zr-based composite oxide is subjected to a heat treatment at 1000° C. for 6 hours or more, the heat-treated Zr-based composite oxide is identified, by an X-ray diffraction measurement, as a mixed phase comprising a phase of the Zr-based composite oxide, and a phase of the oxide of the non-cerium rare-earth metal. That is, even after a long-term heat treatment, a crystal structure of the Zr-based composite oxide will be stably maintained as a mixed phase to suppress a reduction in catalytic efficiency caused by thermal damage of the catalyst layer.

Preferably, the catalyst layer has an upstream-side catalyst sublayer located in an upstream region close to an exhaust gas inlet of the filter body, and a downstream-side catalyst sublayer located in a downstream region closer to an exhaust gas outlet of the filter body relative to the upstream region, wherein the upstream-side catalyst sublayer includes the Zr-based composite oxide, and the downstream-side catalyst sublayer includes a second Zr-based composite oxide which contains zirconium (Zr), and a rare-earth metal except a cerium, wherein a content ratio of an oxide of the non-cerium rare-earth metal to a total amount of $ZrO_2$ and the oxide of the non-cerium rare-earth metal in the second Zr-based composite oxide is set in the range of 8 to 33 mol %.

In a particulate filter, when PM is burnt in an upstream region of the filter in a direction of an exhaust gas stream, heat from the burning will be propagated toward a downstream region of the filter in the direction of the exhaust gas stream. In the above particulate filter, the upstream-side catalyst sublayer contains the oxide of the non-Ce rare-earth metal at a relatively high ratio, so that it can efficiently burn PM even in the upstream region where a temperature of exhaust gas is relatively low. Thus, a temperature of exhaust gas to be led to the downstream region can be increased by burning of PM in the upstream region, to achieve enhanced PM burning capability as the entire particulate filter.

The downstream-side catalyst sublayer contains the oxide of the non-Ce rare-earth metal at a relatively low ratio. Thus, as compared with the upstream catalyst sublayer, the downstream-side catalyst sublayer has higher heat resistance, although it is inferior in PM burning capability. This makes it possible to effectively prevent thermal damage of the catalyst layer in the downstream region having an exhaust gas temperature increased by the burning of PM in the upstream region, and accelerate burning of PM by utilizing heat from the burning of PM in the upstream region.

As above, the particulate filter can burn PM within a shorter period of time while suppressing thermal damage of the catalyst layer. In addition, the higher PM burning rate makes it possible to provide enhanced fuel economy performance in an engine designed to perform a post-injection control.

Preferably, the upstream-side catalyst sublayer is formed to extend from the exhaust gas inlet by a length which is 20 to 60% of a length from the exhaust gas inlet to the exhaust gas outlet of the filter body. This makes it possible to sufficiently increase an exhaust gas temperature based on burning of PM in the upstream-side catalyst layer so as to effectively burn PM even in the downstream-side catalyst sublayer having relative low PM burning capability.

Preferably, the non-cerium rare-earth metal is at least one selected from the group consisting of neodymium, lanthanum and praseodymium. The catalyst layer containing these non-cerium rare-earth metal can more effectively increase the PM burning rate.

Preferably, the Zr-based composite oxide supports platinum thereon. The platinum supported on the Zr-based composite oxide can facilitate increasing the PM burning rate.

Preferably, the catalyst layer further contains alumina supporting platinum thereon. The platinum-supporting alumina contained in the catalyst layer can provide enhanced light-off performance and exhaust gas conversion efficiency for carbon monoxide (CO) and hydrocarbon (HC).

Preferably, the catalyst layer further includes a Zr—Ce based composite oxide which contains zirconium (Zr), and cerium (Ce), and supports platinum thereon. The Zr—Ce based composite oxide contained in the catalyst layer can provide enhanced light-off performance and exhaust gas conversion efficiency for CO and HC.

This application is based on Japanese Patent Application Serial No. 2007-257663 filed in Japan Patent Office on Oct. 1, 2007 and Japanese Patent Application Serial No. 2008-199434 filed in Japan Patent Office on Aug. 1, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A particulate filter adapted to be disposed in an exhaust passage of an engine to trap particulate matter contained in exhaust gas discharged from said engine, said particulate filter comprising:
   a filter body having a porous partition wall which defines a plurality of exhaust gas channels allowing said exhaust gas to pass therethrough; and
   a catalyst layer formed on a surface of said porous partition wall, said catalyst layer including a Zr-based composite oxide which contains zirconium (Zr), and a rare-earth metal except cerium, wherein a content ratio of an oxide of said non-cerium rare-earth metal to a total amount of $ZrO_2$ and said oxide of said non-cerium rare-earth metal in said Zr-based composite oxide is set in the range of greater than 33 mol % to less than 40 mol %.

2. The particulate filter as defined in claim 1, wherein, in a state after said Zr-based composite oxide is subjected to a heat treatment at 1000° C. for 6 hours or more, said heat-treated Zr-based composite oxide is identified, by an X-ray diffraction measurement, as a mixed phase comprising a phase of said Zr-based composite oxide, and a phase of said oxide of said non-cerium rare-earth metal.

3. The particulate filter as defined in claim 1, wherein said catalyst layer has an upstream-side catalyst sublayer located in an upstream region close to an exhaust gas inlet of said filter body, and a downstream-side catalyst sublayer located in a downstream region closer to an exhaust gas outlet of said filter body relative to said upstream region, wherein:
   said upstream-side catalyst sublayer includes said Zr-based composite oxide; and
   said downstream-side catalyst sublayer includes a second Zr-based composite oxide which contains zirconium (Zr), and a rare-earth metal except a cerium, wherein a content ratio of an oxide of said non-cerium rare-earth metal to a total amount of $ZrO_2$ and said oxide of said non-cerium rare-earth metal in said second Zr-based composite oxide is set in the range of 8 to 33 mol %.

4. The particulate filter as defined in claim 3, wherein said upstream-side catalyst sublayer is formed to extend from said exhaust gas inlet by a length which is 20 to 60% of a length from said exhaust gas inlet to said exhaust gas outlet of said filter body.

5. The particulate filter as defined in claim 1, wherein said non-cerium rare-earth metal is at least one selected from the group consisting of neodymium, lanthanum and praseodymium.

6. The particulate filter as defined in claim 1, wherein said Zr-based composite oxide supports platinum thereon.

7. The particulate filter as defined in claim 1, wherein said catalyst layer further contains alumina supporting platinum thereon.

8. The particulate filter as defined in claim 1, wherein said catalyst layer further includes a Zr—Ce based composite oxide which contains zirconium (Zr), and cerium (Ce), and supports platinum thereon.

* * * * *